(12) United States Patent
Felch et al.

(10) Patent No.: US 8,209,597 B2
(45) Date of Patent: Jun. 26, 2012

(54) SYSTEM AND METHOD FOR ACHIEVING IMPROVED ACCURACY FROM EFFICIENT COMPUTER ARCHITECTURES

(75) Inventors: Andrew C. Felch, Hanover, NH (US); Richard H. Granger, Lebanon, NH (US)

(73) Assignee: Cognitive Electronics, Inc., Lebanon, NH (US)

( * ) Notice: Subject to any disclaimer, the term of this patent is extended or adjusted under 35 U.S.C. 154(b) by 299 days.

(21) Appl. No.: 12/728,498

(22) Filed: Mar. 22, 2010

(65) Prior Publication Data

US 2010/0241938 A1 Sep. 23, 2010

Related U.S. Application Data

(60) Provisional application No. 61/162,590, filed on Mar. 23, 2009.

(51) Int. Cl.
*G06F 7/02* (2006.01)
(52) U.S. Cl. ........................... 714/820; 714/822
(58) Field of Classification Search .................. 709/214, 709/224; 370/255; 707/10; 382/180; 714/820, 714/822
See application file for complete search history.

(56) References Cited

U.S. PATENT DOCUMENTS

| | | | |
|---|---|---|---|
| 5,411,824 A | 5/1995 | Vasudev et al. |
| 5,588,152 A | 12/1996 | Dapp et al. |
| 5,590,345 A | 12/1996 | Barker et al. |
| 5,625,836 A | 4/1997 | Barker et al. |
| 5,708,836 A | 1/1998 | Wilkinson et al. |
| 5,713,037 A | 1/1998 | Wilkinson et al. |
| 5,717,943 A | 2/1998 | Barker et al. |
| 5,717,944 A | 2/1998 | Wilkinson et al. |

(Continued)

FOREIGN PATENT DOCUMENTS

EP 1313029 A1 5/2003

(Continued)

OTHER PUBLICATIONS

Vitter, et al., "Approximate Computation of Multidimensional Aggregates of Sparse Data Using Wavelets", "Machine Learning", 1999, pp. 193-204, Publisher: University of California.

(Continued)

*Primary Examiner* — David Ton
(74) *Attorney, Agent, or Firm* — Panitch Schwarze Belisario & Nadel LLP

(57) ABSTRACT

This invention provides a system and method that can employ a low-instruction-per-second (lower-power), highly parallel processor architecture to perform the low-precision computations. These are aggregated at high-precision by an aggregator. Either a high-precision processor arrangement, or a low-precision processor arrangement, employing software-based high-precision program instructions performs the less-frequent, generally slower high-precision computations of the aggregated, more-frequent low-precision computations. One final aggregator totals all low-precision computations and another high-precision aggregator totals all high-precision computations. An equal number of low precision computations are used to generate the error value that is subtracted from the low-precision average. A plurality of lower-power processors can be arrayed to provide the low-precision computation function. Alternatively a plurality of SIMD can be used to alternately conduct low-precision computations for a predetermined number of operations and high-precision operations on a fewer number of operations. In an embodiment, aggregation can include summing values within predetermined ranges of orders of magnitude, via an adding tree arrangement, so that significant digits therebetween are preserved.

20 Claims, 21 Drawing Sheets

U.S. PATENT DOCUMENTS

| | | | |
|---|---|---|---|
| 5,734,921 A | 3/1998 | Dapp et al. | |
| 5,752,067 A | 5/1998 | Wilkinson et al. | |
| 5,754,871 A | 5/1998 | Wilkinson et al. | |
| 5,761,523 A | 6/1998 | Wilkinson et al. | |
| 5,765,011 A | 6/1998 | Wilkinson et al. | |
| 5,794,059 A | 8/1998 | Barker et al. | |
| 5,870,619 A | 2/1999 | Wilkinson et al. | |
| 5,878,241 A | 3/1999 | Wilkinson et al. | |
| 5,963,745 A | 10/1999 | Collins et al. | |
| 5,963,746 A | 10/1999 | Barker et al. | |
| 5,966,528 A | 10/1999 | Wilkinson et al. | |
| 6,094,715 A | 7/2000 | Wilkinson et al. | |
| 6,487,546 B1 * | 11/2002 | Witkowski | 1/1 |
| 6,754,802 B1 | 6/2004 | Kirsch | |
| 6,757,019 B1 | 6/2004 | Hsich et al. | |
| 7,069,416 B2 | 6/2006 | Kirsch | |
| 7,132,664 B1 | 11/2006 | Crosetto | |
| 7,167,890 B2 | 1/2007 | Lin et al. | |
| 7,600,019 B2 * | 10/2009 | Reasor et al. | 709/224 |
| 7,738,404 B2 * | 6/2010 | Deb et al. | 370/255 |
| 2002/0052829 A1 | 5/2002 | Boutilier et al. | |
| 2002/0091789 A1 * | 7/2002 | Katariya et al. | 709/214 |
| 2003/0063742 A1 | 4/2003 | Neufeld et al. | |
| 2003/0219119 A1 | 11/2003 | Kocarev et al. | |
| 2003/0222879 A1 | 12/2003 | Lin et al. | |
| 2006/0067527 A1 | 3/2006 | Urivskiy et al. | |
| 2006/0261279 A1 | 11/2006 | Crosetto | |
| 2007/0083785 A1 | 4/2007 | Sutardja | |
| 2007/0094444 A1 | 4/2007 | Sutardja | |
| 2007/0185884 A1 * | 8/2007 | Kantamneni | 707/10 |
| 2007/0226522 A1 | 9/2007 | Aleksic et al. | |
| 2008/0140921 A1 | 6/2008 | Sutardja et al. | |
| 2008/0320277 A1 | 12/2008 | Fish, III | |
| 2009/0070607 A1 | 3/2009 | Safford et al. | |
| 2009/0293061 A1 | 11/2009 | Schwinn et al. | |
| 2009/0304280 A1 * | 12/2009 | Aharoni et al. | 382/180 |
| 2010/0042563 A1 | 2/2010 | Livingston et al. | |

FOREIGN PATENT DOCUMENTS

| | | |
|---|---|---|
| WO | WO 9516239 A1 | 6/1995 |
| WO | WO 9963751 A1 | 12/1999 |
| WO | WO 03088033 | 10/2003 |
| WO | WO 2005062224 A1 | 7/2005 |
| WO | WO 2009111559 A2 | 9/2009 |

OTHER PUBLICATIONS

Damagard, et al., "Average Case Error Estimates for the Strong Probable Prime Test", "Mathematics of Computation", Jul. 1993, pp. 177-194, vol. 61, No. 203.

Kempe, et al., "Gossip-Based Computation of Aggregate Information", "44th Annual IEEE Symposium on Foundations of Computer Science", Oct. 11, 2003, pp. 1-10, Publisher: IEEE.

Brieman, et al., "Random Forests", Oct. 2001, pp. 1-32, vol. 45, No. 1, Publisher: University of California.

Elliot et al., "Computational RAM Implementing Processors in Memory", Mar. 1999, pp. 32-41, Publisher: IEEE, Published in: US.

Cascaval et al, "Evaluation of a Multithreaded Architecture for Cellular Computing", 2002, pp. 1-11, Publisher: IEEE, Published in: US.

Murakami et al, "Parallel Processing RAM Chip with 256Mb DRAM and Quad Processors", Feb. 1997, pp. 228-229, Publisher: IEEE, Published in: JP.

Grimm et al, "Parallel Volume Rendering on a single-chip SIMD Architecture", 2001, pp. 107-114, Publisher: IEEE, Published in: DE.

Birkland et al, "The Petacomp Machine A MIMD Cluster for Parallel Pattern Mining", 2006, pp. 1-10, Publisher: IEEE, Published in: NO.

Barroso et al, "Web Search for a Planet The Google Cluster Architecture", Mar. 2003, pp. 22-28, Publisher: IEEE, Published in: US.

Hennessy et al, "MultiThreading Using ILP Support to Exploit Thread Level Parallelism", 2007, pp. 172-179, Publisher: Computer Architecture, Published in: Us.

Moore, Branden J., "Exploiting Large Shared On-Chip Caches for Chip Multiprocessors", Apr. 2005, pp. 1-69, Published in: US.

Olukotun et al, "Chip Multiprocessor Architecture", Nov. 28, 2007, pp. 1-47, Publisher: Morgan & Claypool, Published in: US.

* cited by examiner

SYSTEM AND METHOD FOR ACHIEVING IMPROVED ACCURACY FROM EFFICIENT COMPUTER ARCHITECTURES

RELATED APPLICATIONS

This application claims the benefit of U.S. Provisional Application Ser. No. 61/162,590, filed Mar. 23, 2009, entitled SYSTEM AND METHOD FOR ACHIEVING IMPROVED ACCURACY FROM EFFICIENT COMPUTER ARCHITECTURES, the entire disclosure of which is herein incorporated by reference.

FIELD OF THE INVENTION

Computers have become an essential tool in variety of predictive operations. For example, modern weather prediction employs large banks of high-speed computers to model weather systems. Likewise, computers are increasingly employed to model and predict outcomes in financial markets. Some financial modeling systems operate huge numbers of power-hungry computers in an effort to provide predictive data relative to the highly complex and variable-rich financial environment.

A particular task in computational finance is the determination of a financial instrument's true value. Data centers filled with computers are responsible for calculating financial equations as quickly as possible without exceeding the budgeted hardware cost, cooling capacity and concomitant electricity usage. Many methods exist for pricing financial instruments, each with different characteristics such as requisite time, memory, and resulting accuracy. A common pricing technique is based upon the well-known Monte Carlo method, which determines a price by averaging millions of hypothesized ways in which the future can unfold. A particular example of the Monte-Carlo method can be provided in the context of pricing European Call Options. This type of financial derivative affords the buyer the right (but not obligation) to purchase a set quantity of a certain stock at a certain price at a given time in the future, as specified in the contract. For example, the S&P 500 index may presently trade at $900, and the call option may allow purchase of 1 share of stock 1 year in the future for $950—the collective assumption being that the market will rise to that extent within the year.

Intuitively, 1 year later the buyer of the option will purchase the share for $950 if the share is trading at over $950 (thus buying it at a discount at that time). If the share is trading any lower that $950, the option will not be exercised and thus the original money paid for the option will be lost without benefiting the buyer.

To calculate the value of this option using the Monte Carlo method, multiple scenarios are run, each one based on a different random variation of the current stock price. The technique determines how often the scenarios result in a stock price above $950, and what the average payoff would be in these cases. The following equation (1) shows the profit simulation function S( ), which uses multiple random numbers $R=\{r_1, r_2, \ldots, r_n\}$ as input and the average is the expected profit V.

$$v = \frac{\sum_{i=1}^{n} S(r_i)}{n} \quad (1)$$

By way of example, if the technique performs 10 Monte Carlo simulations it would generate the following 10 exemplary random Price Changes:
+36.6%, +10.2%, −28.1%, −32.5%, −15.3%, +5.8%, +12.9%, +33.1%, +5.5%, −39.6%.

With a starting price of $900, these Price Changes respectively result in the following Resulting Prices:
$1229.4, $991.8, $647.1, $607.5, $762.3, $952.2, $1016.1, $1197.9, $949.5, $543.6.

Thus, the option to purchase 1 share at $950 has a respective value in terms of Resulting Profit:
$279.4, $41.8, $0, $0, $0, $2.2, $66.1, $247.9, $0, $0.

It should be clear that the resulting price must be greater than $950 to yield any Resulting Profit. (Note that "price" and "profit" are used herein somewhat interchangeably since the expected profit derives the price of the option). When a scenario has profit, it is multiplied by the number of shares included in the option, which is only 1 exemplary share in this example.

Finally, the total profit of all scenarios is divided by the number of scenarios simulated to derive Expected Profit:
($279.4+$41.8+$2.2+$66.1+$247.9)/10=$63.74.

Adding one more random scenario can possibly result in an additional simulation such as a +24% price change, which would significantly increase the finally calculated value of the option from the current $63.74 to more than $73. Thus, this final estimate of $63.74 is not very accurate because only 10 scenarios were simulated (a very small number). The accuracy t of the final result (intuitively, this is the number of significant digits) can be calculated as the standard deviation σ ("sigma") divided by the square root of the number of samples n. This is shown in the following equation (2):

$$t = \frac{\sigma}{\sqrt{n}} \quad (2)$$

Here, t is the accuracy of the finally calculated value (actually, its standard deviation). That is to say, the true value is about 50% likely to be as close as t to the final estimate and about 95% likely to be within 2t. Thus very small t result in very accurate pricing estimates; but to achieve very small t, the number of simulations, n, must be very large or the standard deviation a must be small. We can calculate the standard deviation a as the square root of the sum of the squares of the samples $x_1, x_2, \ldots, x_n$ subtracted from the mean $\bar{x}$ (here, $\bar{x}$ is equal to v from equation (1)).

$$\sigma = \frac{\sqrt{\sum_{i=1}^{n} (\bar{x} - x_i)^2}}{n} \quad (3)$$

In this example the samples are $279.4, $41.8, $0, $0, $0, $2.2, $66.1, $247.9, $0, $0 and the mean is $63.74. Therefore, the standard deviation is $102.48.

For some tasks, the desired accuracy is to price within half a penny with 95-99% confidence. Thus, it can be necessary to calculate the final profit to within a few hundredths of a penny to gain this level of confidence. Since the standard deviation is determined by the problem itself, the only parameter that can be modified to achieve this accuracy is the number of simulations n. FIG. 1 shows a graph 100 of the number of simulations required to simulate prices with a $100 standard deviation to such a level of confidence, which is approximately $10^{13}$ (10 trillion). As shown, the x-axis 110 is the number of Monte Carlo samples and is provided on the log scale, increasing from 1 to 100 trillion from left to right. The points along the dashed line 112 indicate a price estimate within $10^{-4}$ (plus or minus) of the true price, denoted as "a". Points along the y-axis below the dashed line 112 indicate underestimates of the price, and are on the log scale. Points along the y-axis 120 above the red line are overestimates of the price and are also on the log scale. Accuracy of v approaches one hundredth of a penny (dashed line 112) as the number of Monte Carlo samples approaches 10 trillion. This is noted with an arrow 130, at which point simulation can be stopped if $10^{-4}$ is the desired accuracy.

Computers carry out financial calculations using binary representations stored in so-called "floating point" numbers that represent values in scientific notation such as $1.52341*10^4$ (equal to 15234.1). Traditionally, financial calculations are carried out with a high number of significant digits, such as 16 digits (or 53 bits), to avoid errors in the results. To support a large number of significant digits (e.g. 15 digits to the right of the decimal point) a computer processor must use large silicon die area (related to manufacture cost) and power consumption—and calculations require more time to complete than calculations that use fewer significant digits.

For example, one of the most essential functions in financial applications is the "exp" function (See equation (4)), which is used to create the required "log-normal" distribution of random price changes. An efficient method to carry out exp requires a number of steps linearly increasing with the number of significant digits. Thus the exp function of a number with 3 significant digits takes about one-fifth the time as 15 significant digits.

$$\exp(x)=e^x \quad (4)$$

Furthermore, the computer architecture must use multiplication hardware that supports at least as many digits as is being used. It is known that the power usage and die area required for a multiplier with X significant digits is proportional to $X^2$. In FIG. 2 this computational overhead is visualized in the chart 200 by writing out multiplication of 3 digits (column 210) and 16 digits (column 220) using the traditional pencil-and-paper method on an exemplary set of digits. The 16-digit multiplication takes about 25 times more computational effort:

The three-significant-digit calculation (column 210) involves 9 intermediate values to add whereas the 16-significant-digit calculation (column 220) requires over 250 intermediate values. The final results are rounded to the same number of significant digits as the inputs. Even within the first three digits the results are different (0.0531 compared to 0.533). For problems that do not require the added precision, the 3-significant-digit calculations are 25 times more efficient.

In the context of the exp function, which is performed in multiple steps that each require multiplication, this means that using 16 digits (as in the above example) requires 125 times more power and processor resources than using 3 digits.

It is, therefore, desirable to provide a system and method for performing high-accuracy Monte Carlo and similar calculations with a large number of significant digits, but with reduced computing power. This system and method should allow the use of efficient computing architectures with the potential for reduced power consumption.

SUMMARY OF THE INVENTION

This invention overcomes the disadvantages of the prior art by providing a system and method for reducing error in the accomplishment of Monte Carlo-based simulations (and other similar estimates of characteristics of aggregate data using highly iterative samples—for example overall sampling numbers exceeding approximately $10^6$ or greater) using a processor arrangement that enables performance of iterative computations which include a predetermined combination of lower-precision computations and higher-precision computations. This system and method accordingly achieves the same pricing accuracy as traditional Monte Carlo results. Specialized low-power processor arrangements and/or the incorporation of a larger-scale instantiation of conventional low-precision or low-power (and potentially lower cost) processors is used to accomplish the computational task. Such low-power processors can include cell processors and/or single instruction multiple data (SIMD) type processors. In an embodiment, the system and method allows for the replacement/mapping of inherent double-precision instruction values (for example in an existing C++ code program instruction set) with single-precision instruction values (as needed to prevent errors) so that the existing code can be employed in the processor arrangement of the system and method. This enables existing program instructions to operate within the processor arrangement free of a need to rewrite the code by providing, for example, a conventional search- and replace function. In an illustrative embodiment, a similar set of random numbers is employed throughout the sampling computation (i.e. using the same seeds). These random number seeds allow generation of iterative samples. The low-precision samples are iteratively generated using lower-precision and aggregated in higher-precision through a plurality of levels of aggregators. A significantly smaller number of iterations of a higher/double-precision computation is undertaken using the same random number seeds, and by either another high-precision processor architecture or by a portion of the low-precision architecture having a mechanism (hardware or software) for achieving high-precision. The high-precision computations are combined with an equal number of the low precision computations to generate an error value. This is used to compensate for the average value in the overall low-precision average by subtracting the error from the low-precision average.

In an illustrative embodiment, the system and method can employ a low-instruction-per-second (lower-power), highly parallel processor architecture to perform the low-precision computations. These are aggregated at high-precision by an aggregator. Either a high-precision processor arrangement, or a low-precision processor arrangement, employing software-based high-precision program instructions performs the less-frequent, generally slower high-precision computations of the aggregated, more-frequent low-precision computations. One final aggregator totals all low-precision computations and another high-precision aggregator totals all high-precision computations. An equal number of low precision computations are used to generate the error value that is subtracted from the low-precision average.

A plurality of lower-power processors can be arrayed to provide the low-precision computation function. Alternatively a plurality of SIMD can be used to alternately conduct low-precision computations for a predetermined number of operations and high-precision operations on a fewer number of operations.

In an embodiment, aggregation can include summing values within predetermined ranges of orders of magnitude, via an adding tree arrangement, so that significant digits therebetween are preserved.

In an embodiment, the low-precision processor array can include a memory arrangement that stores program instructions for performing single-precision computation function in association with single-precision processor hardware. Illustratively, the program instructions can comprise instructions converted from double-precision computation functions to the single-precision computation functions by a find-and-replace procedure. The program instructions can be provided as C++ program language instructions.

BRIEF DESCRIPTION OF THE DRAWINGS

The invention description below refers to the accompanying drawings, of which.

DETAILED DESCRIPTION

I. Principles of Operation

Figure 1:
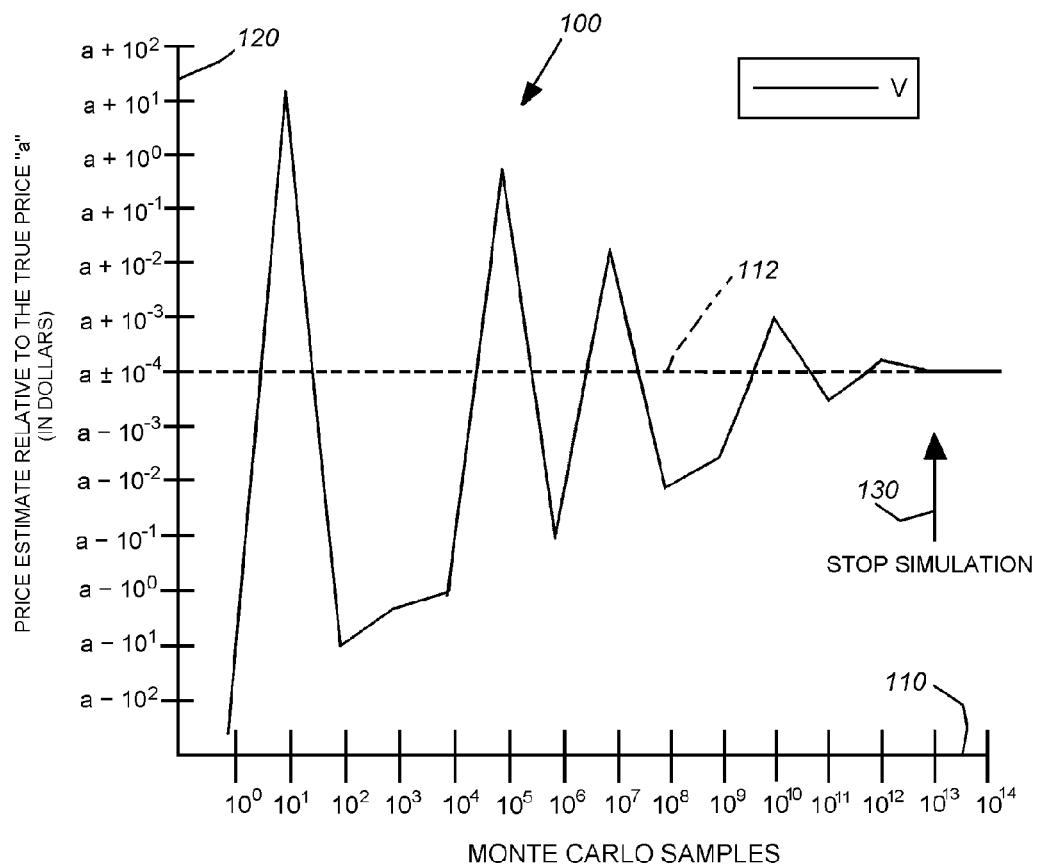
FIG. 1, already described, is a graph showing a curve $v_{low}$ representing the number of Monte Carlo samples simulated versus the deviation in estimated price relative to a true/actual price a and illustrating the gradual approach of the estimate to a desired deviation from actual price after a substantial number of samples.
Figure 2:
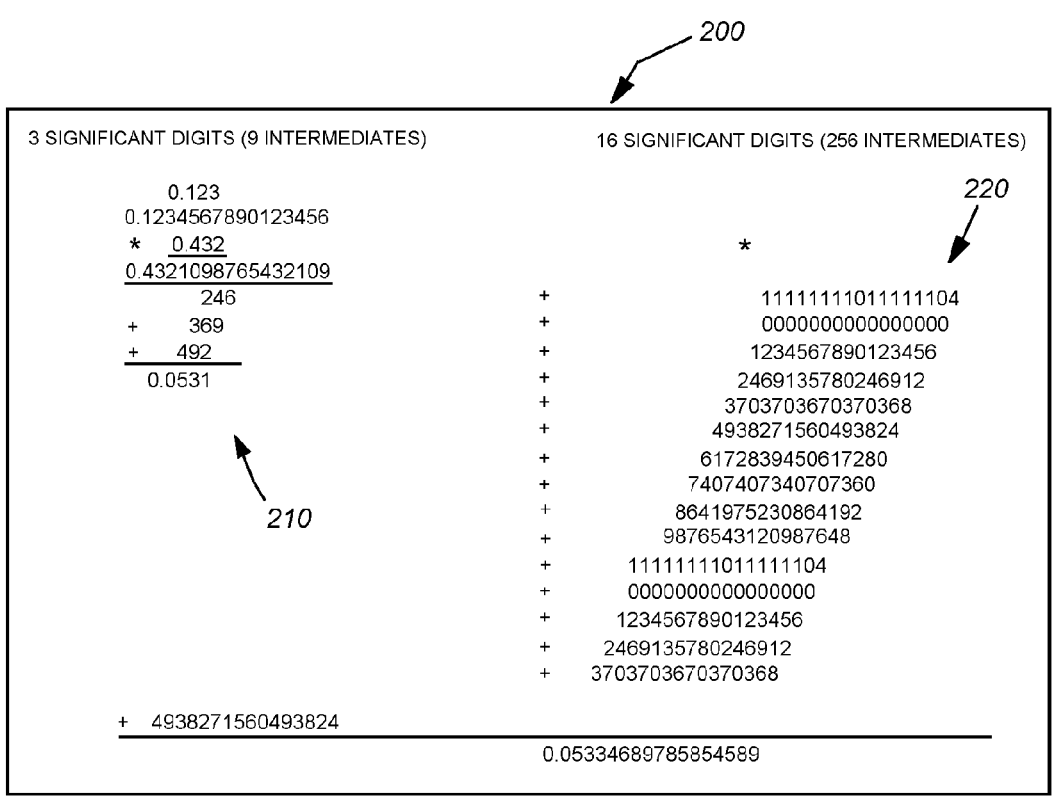
FIG. 2, already described, is a table showing the substantial difference between computational overhead as illustrated by the corresponding difference in the number of intermediates between a computation with only 3 significant digits and a computation with 16 significant digits.

With reference to the computational results depicted in FIGS. 1 and 2 above, intuition might suggest that the final results of averaging across Monte Carlo simulations cannot be more accurate than the number of significant digits used in each simulation. A counterintuitive effect called "coarse coding", however, does indeed allow the final average across low-precision results to have much higher precision than its constituent operands; provided the summation operations that derive the final average are calculated in high precision. Thus, it is possible for Monte Carlo simulations to be carried out in low precision by an efficient computer architecture and arrive at equally accurate results compared to a high-precision-only computer architecture that uses potentially 100 times more power. Further investigation into the practical use of this technique, however, discovered an anomaly, which is shown in the graph 300 of FIG. 3.

As in FIG. 1, the simulated prices have a standard deviation of $100. Monte Carlo simulations were performed using low-precision for all calculations except during the final averaging. As with the high precision calculations in FIG. 1, accuracy improves as more simulations are performed. In contrast to high precision simulations, however, accuracy plateaus and does not improve beyond $10^{-3}$ even as the number of simulations grows to 100 trillion.

Figure 3:
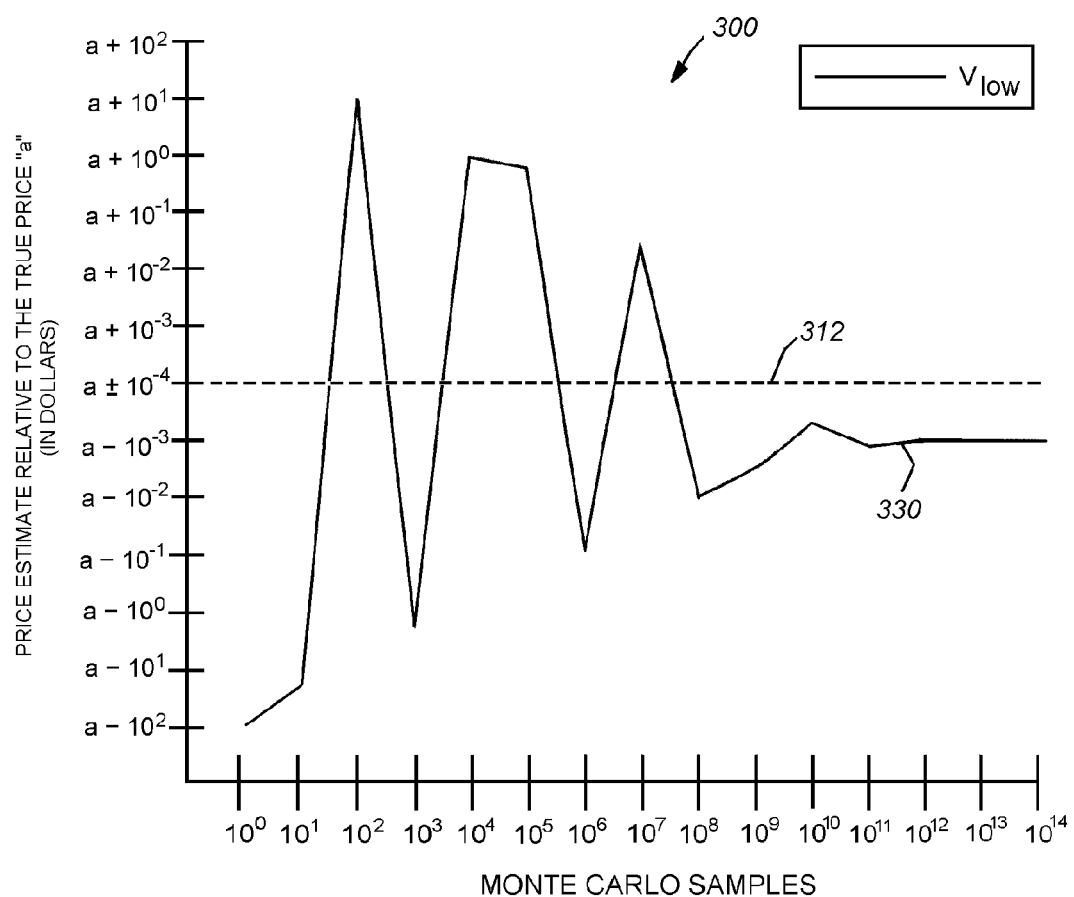
FIG. 3 is a graph showing the curve $v_{low}$ in a computation using a low number of significant digits (low-precision), illustrating the gradual approach of the estimate to a price that represents an undesirable level of deviation from the actual price after a substantial number of samples.

FIG. 3 generally shows that using low-precision calculations causes a systemic error. In the example, this prevents accuracy from improving beyond $10^{-3}$. This is indicated by the deviation of the curve 330 below the dashed line 312, as sample size exceeds 100 trillion. Systemic error might occur, for example, when the input to a function (such as the exponentiation required in all Monte Carlo simulations) must first be rounded, and all the inputs that round to X are not equally likely, and thus cause unpredictable numerical artifacts. Such rounding operations can cause systemic error, resulting in a loss of accuracy that cannot be recovered regardless of the number of Monte Carlo simulations.

An illustrative embodiment provides a novel procedure to enable the bulk use of low-precision calculations to derive a highly accurate final price with the systemic error removed. This is accomplished by calculating the low-precision and high-precision results in parallel when each is given the same random numbers as input.

For example, simulation can be performed on a 5.32% gain of a stock price. The low-precision calculation may round to a 5.3% gain for its calculations whereas the high-precision calculations may use the exact 5.32% gain value, and the resulting calculated stock price of the low-precision calculations will be slightly different from the high-precision-calculated stock price. The key realization is that the difference between the two parallel simulation results is very small—much smaller than the raw variability of the stock price.

By way of further example, the standard deviation of the price simulations can be $100 (as in FIGS. 1 and 3, described above, and the previous example), whereas the difference between the low-precision calculations and high-precision calculations will be much smaller, perhaps on average the low precision and high precision simulations are within $1 of each other.

Recall from the earlier example, the random exemplary price changes on an initial stock price of $900:
+36.6%, +10.2%, −28.1%, −32.5%, −15.3%, +5.8%, +12.9%, +33.1%, +5.5%, −39.6%.

As an example, the low-precision calculations can have the effect of rounding these percents to the nearest integer:
Low-precision price changes:
+37%, +10%, −28%, −33%, −15%, +6%, +13%, +33%, +5%, −40%.

With a starting price of $900, these changes result in the following profits:
High-precision profits: $279.4, $41.8, $0, $0, $0, $2.2, $66.1, $247.9, $0, $0.
Low-precision profits: $283, $40, $0, $0, $0, $4, $67, $247, $4, $0.
Difference d: $3.6, −$1.8, $0, $0, $0, $1.8, $0.9, −$0.9, $4, $0.

Equation (5) shows how to calculate the average difference d between the high precision simulation function $S_{high}()$ and low precision simulation function $S_{low}()$ by using the same set of random numbers $R=\{r_1, r_2, \ldots, r_m\}$ as input to them both.

$$d = \frac{\sum_{i=1}^{m}(S_{low}(r_i) - S_{hight}(r_i))}{n} \quad (5)$$

Thus, in the example, the average difference d is $0.76.

This calculation can derive both the average difference d, and the standard deviation of the difference $\tau_{low-high}$ by substituting the simulations into equation (3) to arrive at equation (6):

$$\sigma_{low-hight} = \frac{\sqrt{\sum_{i=1}^{m}((S_{low}(r_i) - S_{high}(r_i)) - d)^2}}{m} \quad (6)$$

Thus, in accordance with the solution, the exemplary standard deviation of difference $\tau_{low-high}$ is $1.77.

Figure 4:
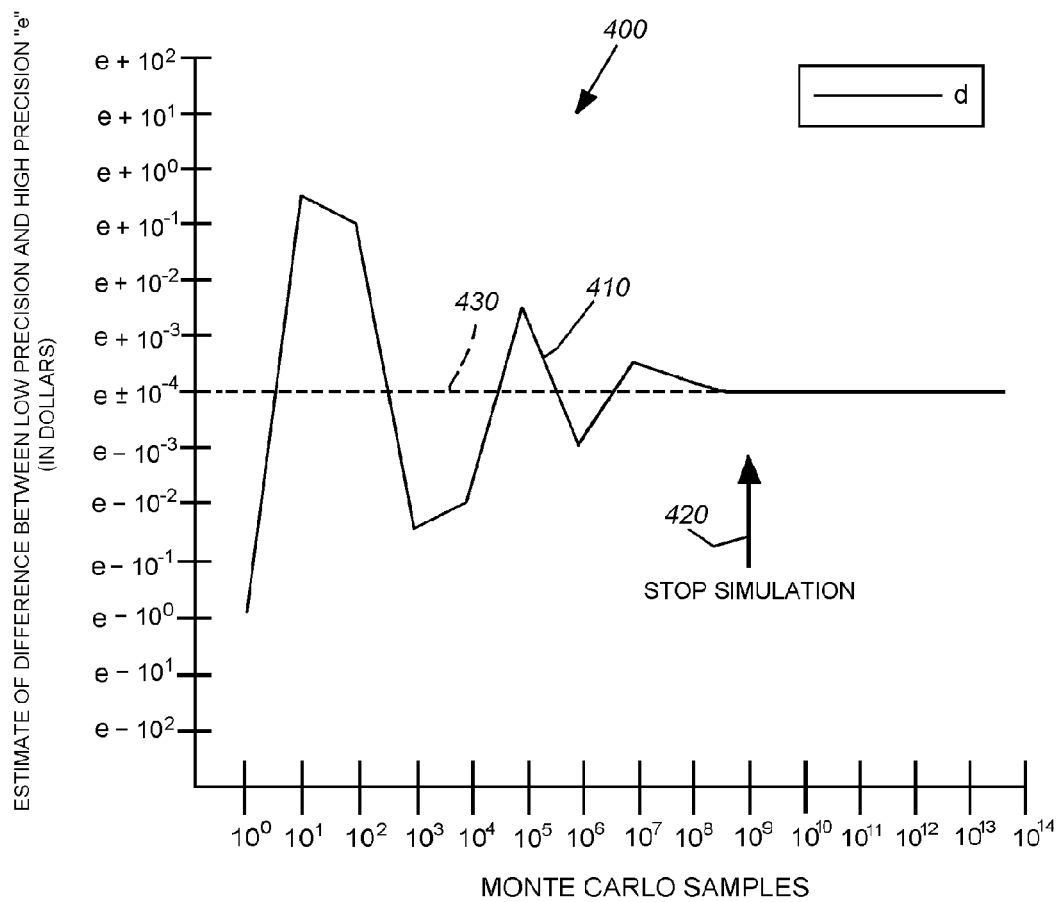
FIG. 4 is a graph showing the curve d that is the estimate of the difference e between the final low-precision simulation average and the high-precision simulation average, which converges to the true difference e substantially more rapidly than either the high-precision or low-precision calculations would converge to a true price a with the same accuracy.

The illustrative embodiment contemplates the fact that the standard deviation of the stock prices $\tau$ is approximately $102, whereas the standard deviation of the difference $\tau_{low-high}$ between high-precision and low-precision prices, is much less, at $1.77 in this example. From equation (1) above it is understood that the smaller standard deviation $\tau_{low-high}$ translates into fewer simulations m which are required to achieve an estimation of d to the desired level of accuracy $t_{low-high}$. The graph 400 in FIG. 4 illustrates this effect. As shown by the curve 410, accuracy of d improves toward the true difference e as the number of simulations m increases. Once d has been estimated it can be subtracted from the $v_{low}$ to deliver a more-accurate estimation of the true profit. This removes the systemic error from $v_{low}$. As shown, after approximately one billion ($10^9$) simulations (arrow 420), the curve stabilizes on the dashed line value 430.

Figure 5:
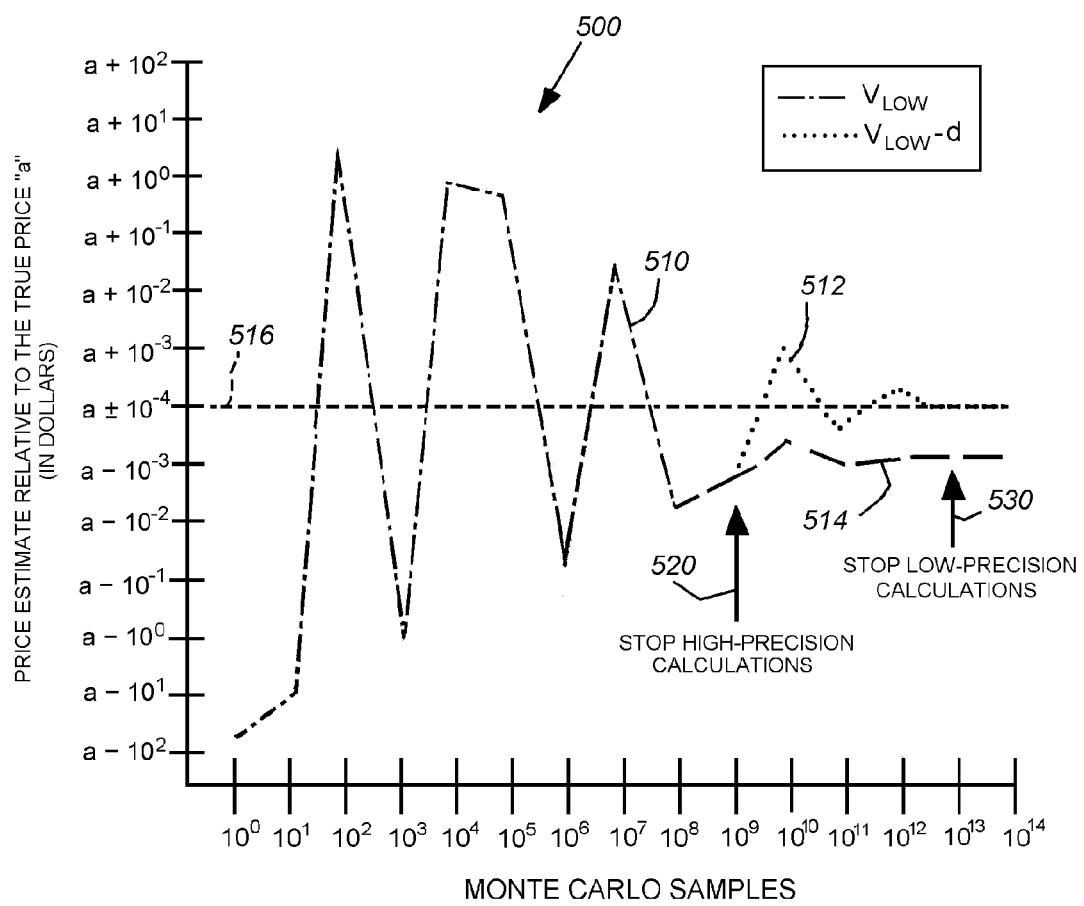
FIG. 5 is a graph showing the curves $v_{low}$ and $v_{low}$-d illustrating a comparison between only low-precision calculations and low precision calculations followed by a substantially reduced number of high-precision calculations.

FIG. 5 shows a graph 500 illustrating the resulting improved estimation of the true profit "a" next to an undesirably deviating estimation. The left hand side of the curve 510 is similar to the curve 330 of FIG. 3. However, the illustrative acceptably deviating (corrected) curve (indicated by the right-hand side 512 deviates from the path 514 of the uncorrected curve (330). The corrected curve desirably settles onto the dashed line 516. The distinction in the corrected curve 512 is that $v_{low}$ can now be compared to the corrected low-precision results: "$v_{low}$−d". Also denoted in the graph 500 is the point (arrow 520) at which high-precision calculations to derive d can be stopped, which is after approximately $10^9$ simulations. Thereafter, the curves 512, 514 diverge, and the corrected curve 512 becomes flat with respect to the desired precision (dashed line 516) following approximately $10^{13}$ simulations (arrow 530), about 10,000 times more low-precision calculations have been performed than high-precision calculations.

From the graph 500 of FIG. 5 it is clear that approximately 10,000 subsequent low-precision calculations are performed for each initial high-precision calculation in the illustrative procedure. Because the high-precision calculations are rarer in this computational procedure, a computational cluster can potentially benefit from employing a computer architecture that sacrifices high-precision performance in order to devote resources toward highly efficient low-precision calculations. In one illustrative embodiment, this can be achieved by supplementing each high-precision-oriented processor (such as the Core 2™ architecture chip available from Intel Corporation of Santa Clara Calif.) with an associated array of low-precision co-processors may deliver an overall computer cluster with vastly improved efficiency.

As described below (see FIGS. 6 & 7), an architecture for a low-precision, power-efficient chip can be provided in which the design uses 2 watts to achieve the same instruction throughput as a 20-watt Intel processor core. By way of example, if the power-efficient chip is equipped with high-precision multipliers to enhance precision-based computations, and these multipliers are operating constantly, then the power usage of the otherwise power-efficient chip potentially increases to 10 watts. Thus an architecture that is initially ten times as power efficient as the Intel Core is reduced an efficiency improvement of only two times.

However, the illustrative embodiment contemplates use of a power-efficient processor to support financial Monte Carlo applications that still maintains its power-efficiency advantages over traditional high-precision processors. The power-efficient processor can be used as a co-processor in conjunction with a more-conventional processor arrangement, which delivers the high-precision and/or other computational tasks.

II. Exemplary Low-Precision Processor

An example of a low-precision processor and exemplary multi-core/multi-processor environment is shown in FIGS.

6-13. Generally, the processor architecture supports a highly parallel arrangement in which a large number of individual processors can be provided to a single chip, and a large number of chips work in parallel to handle a number of tasks that lend themselves well to parallel computational operations, rather than serial operations. One such exemplary process is the searching of web pages used by web searching portals, in which a large number of pages are searched for particular key words or information, each of which pages in not serially interconnected with the other. The exemplary processor and computing arrangement is further described, by way of useful background in commonly assigned, copending U.S. patent application Ser. No. 12/236,187, entitled PARALLEL PROCESSING COMPUTER SYSTEMS WITH REDUCED POWER CONSUMPTION AND METHODS FOR PROVIDING THE SAME, by Andrew C. Felch, et al., the teachings of which are expressly incorporated by reference. Pertinent parts of this overall application are now described to afford a better understanding of the exemplary system environment and processor architecture.

Figure 6:
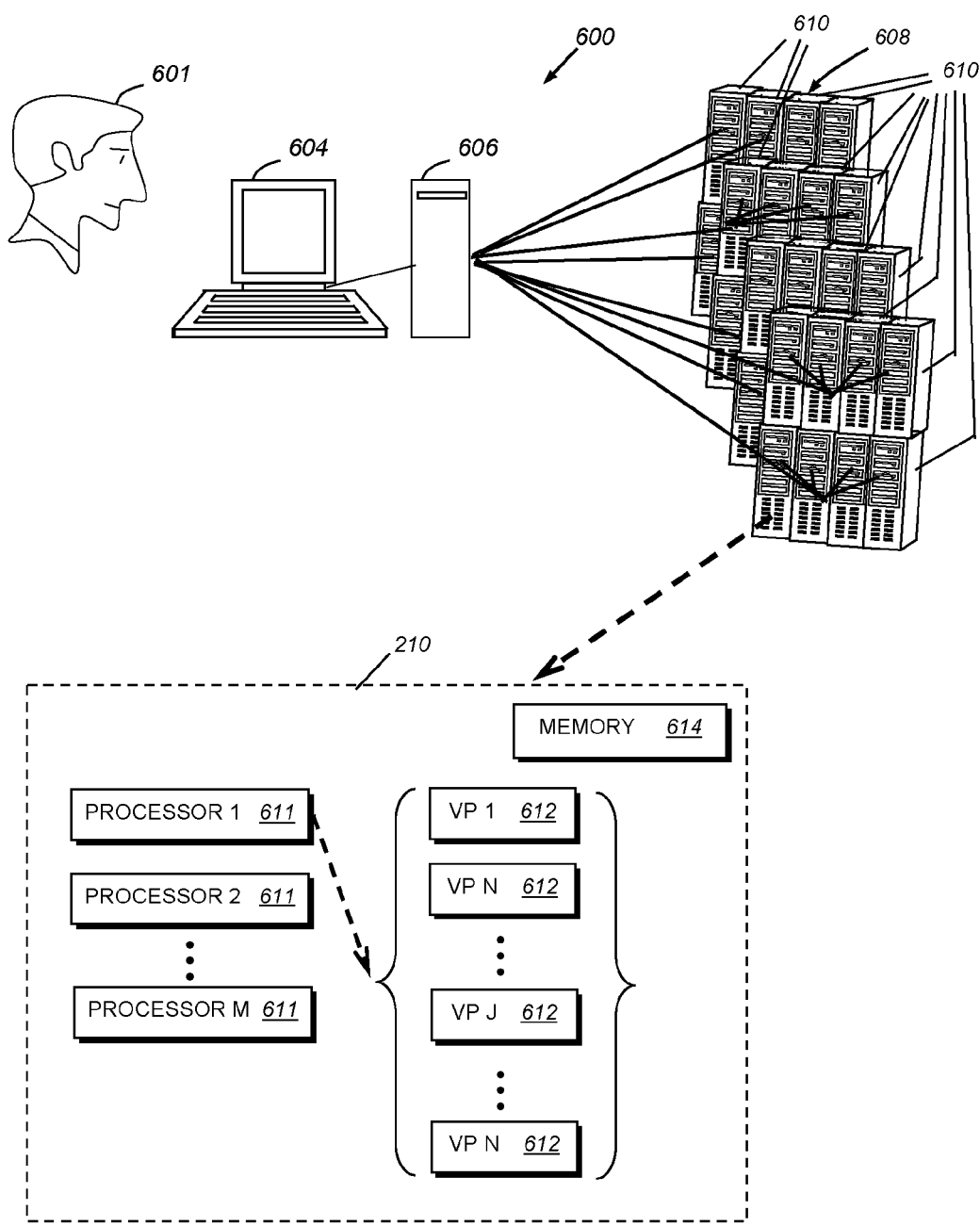
FIG. 6 is a block diagram of an illustrative embodiment of a computational system used for web searches and/or other highly iterative tasks that can benefit from a power-efficient architecture.

As shown in FIG. 6, a user 601 interfaces with a computer 606 and display 604 that communicates (using an appropriate interconnection) with a cluster 608 of computers, including networked nodes 610. In one embodiment, a given computer (used to search for web pages or other "search items") is used to implement a given node 610. At least one of the computers 610 is replaced with one or more power-efficiency-enhanced computers. The one or more power-efficiency-enhanced computers collectively include M processors 611. The M processors 611 are configured to emulate N virtual processors (VP), and they are configured to limit a rate at which each of N virtual processors accesses memory. In the embodiment of FIG. 6, an integer value "J" (k=J) of virtual processors is emulated by a given processor, which is PROCESSOR 1 in the illustrated example. M and N are integer values, and N is larger than M. In one variation of this embodiment, the memory accessed by each of the virtual processors 612 is DRAM, which has a larger capacity and consumes less power than SRAM. In a more specific variation, N equals kM, where k is an integer. In one example embodiment, k=16.

The M processors may be connected to each other via a network connection, for example, a gigabit per second (gbps) Ethernet network. In certain embodiments, the clock rate of a given one of the M processors may be s MHz, and the effective memory access rate of a given one of the N virtual processors 112 may be substantially less than s (e.g., approximately s/k MHz). In one embodiment, s=350 MHz, while k=16.

Replacing the computers with power-efficiency-enhanced computers may be done by providing search processing cards, each of which holds a number of networked processors networked together, wherein each of the networked processors implements a number of emulated virtual processing threads. In the illustrated embodiment of FIG. 6, this number is J. In one embodiment, one search processing card includes 16 networked processors, and each networked processor implements 16 virtual processors.

Memory associated with given virtual processors may be embedded on the same chip as the processors emulating those given virtual processors. Alternatively, the memory may be on a dedicated chip separate from the chip holding the processors emulating the given virtual processors.

A group of less than N emulated processing threads may share a small low-power memory. This small low-power memory may, for example, be 1 MB. More specifically, this small low-power memory may be 1 MB of DRAM, which may be accessed at a lower rate, for example, at 170 MHz. A given emulated processing thread may be assigned to a portion of the small low-power memory that is dedicated to the given emulated processing thread. Meanwhile, all of the threads in a group (i.e., implemented by the same set of one or more processors) may share a common portion of the memory that holds web page data.

Figure 7:
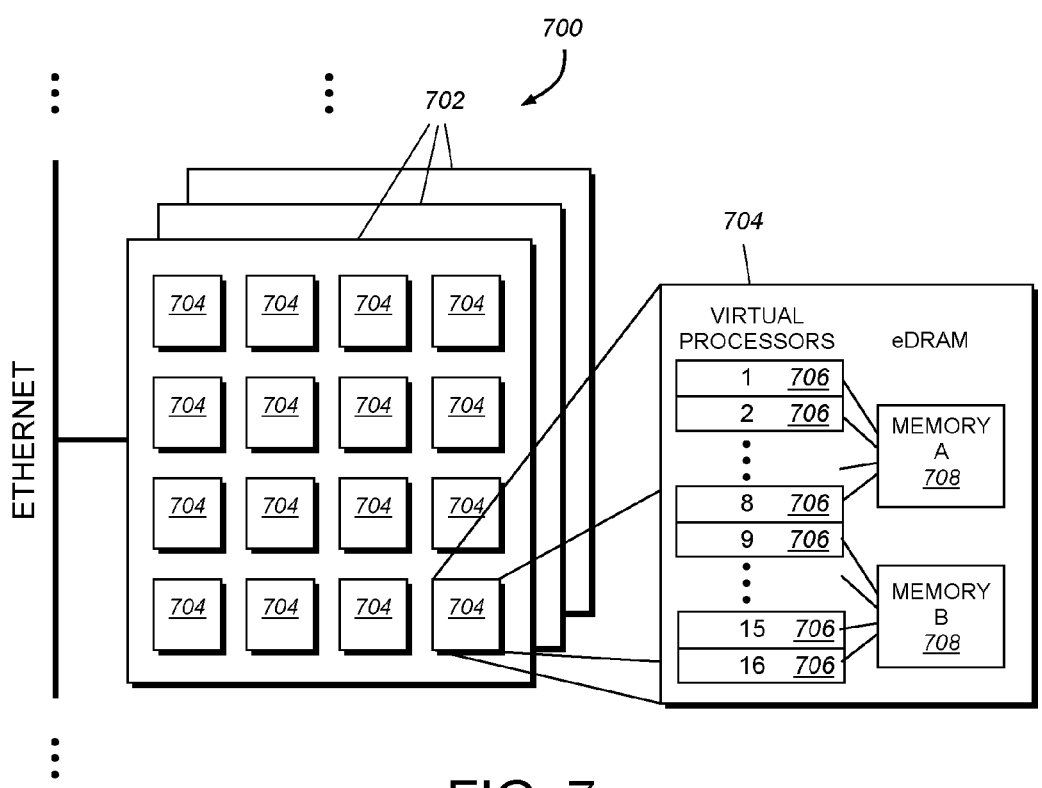
FIG. 7 is a block diagram of an illustrative embodiment of a processor system according to an illustrative embodiment.

As shown in FIG. 7, a processing system 700 can be provided, which include many modules 702, each module 702 being implemented as a small flat computer chip approximately 150 square millimeters in area. In the embodiment shown in FIG. 7, search processing system 700 is shown in a disassembled form to illustrate the manner in which subcomponents can be combined to form an entire architecture.

Each module 702 can contain 16 processor cores 704. In the embodiment shown in FIG. 7, each processor core runs at 350 MHz, resulting in an aggregate processing rate of 5.6 GHz for a given module 702. 16 times 21 MHz equals 336 MHz which is a value approaching the rate of each processor core which is 350 MHz.

In this embodiment, each processor core 704 is time-sliced into 16 virtual processors, logically running at 21 MHz.

Time slicing in this way may provide a much longer time window for each virtual processor 706 to complete instructions. This amount of time is 150 times longer than that of some Intel CPUs.

This enables the use of slower or longer memory latency such as that provided by DRAM, which has a larger capacity and is more power-efficient at these larger capacities than SRAM of some CPUs.

In this embodiment, search processing system as shown in FIG. 7 can define 15 nanoseconds between logical cycles where the Intel Q9770 has only 300 picoseconds. The reduced memory access speed of virtual processors 706 as shown in FIG. 7 (of 21 MHz) also serves to prevent stalls, for example, that regularly occur with the Intel CPU.

Special instructions (IF-THEN) called code "branches" are common in web searches. This occurs when a search program checks whether a page has all the key words, and, if so, whether they are spread throughout the page or placed in the same sentence (indicating a better match).

In a given module 702 as shown in FIG. 7, processor cores 704 are laid out in the form of a matrix. The modules 702 are connected to an illustrative gigabit Ethernet network (or other form of connectivity), so that million of modules can operate together. Each module 702 includes 16 cores, each running at 350 MHz. Each core 704 is time sliced into 16 virtual processors each running at 350/16=21 MHz. Each processor core 704 is provided with local memory (including memory A 708 and memory B 708 (each of which are eDRAM memory)). This allows a given processor core 704 to provide each of its virtual processors 706 with sufficient bandwidth (to memory) to allow one load or store per clock cycle.

In the illustrated example, each 170 MHz eDRAM supplies eight 21 MHz virtual processors 706. Power usage of a given search processing module 704 (including 256 virtual processors 706 in the illustrated embodiment) can be estimated by utilizing information from studies related to each subcomponent. Based upon some calculations, the power usage of the active processing cores 704 may be 600 milliwatts, while the Ethernet connection may consume 200 milliwatts, and the overall network hub may consume 200 milliwatts.

Memory can be embedded in the same silicon as each processor core 704, or alternatively put on dedicated memory chip that is placed in the same package. Such memory may consume, for example, 680-800 milliwatts during activity and very low-power at idle. Accordingly, it is estimated that the illustrated search process system 700 may consume at most 1.7 watts.

Actual experimental tests of the 3.2 GHz Intel QX9770 estimate a power usage of 19.5 watts per processor core. Memory usage of that same core is estimated to be 6 watts during activity and 3 watts during idle.

Figure 8:
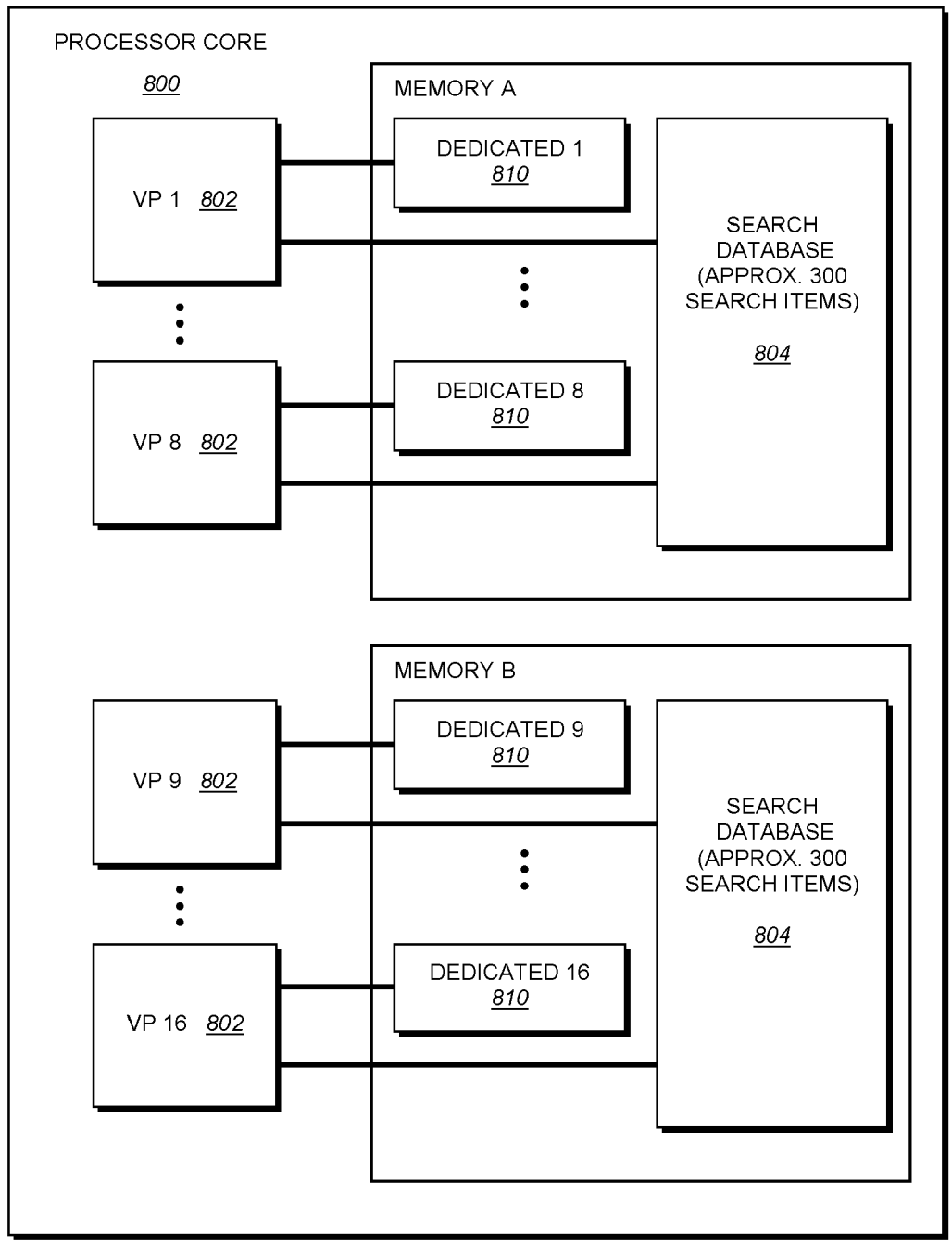
FIG. 8 is a block diagram of an further illustrative embodiment of a processor core according to an illustrative embodiment.

FIG. 8 shows another embodiment of a processor core 800 which can be provided, for example, on a search processing module 702, for example, as shown in the embodiment of FIG. 7.

The illustrated processor core 800 includes 16 virtual processors 802. A given one of the virtual processors, for example, VP1, is coupled to a dedicated portion (Dedicated 1) of memory A, and to a search item database portion 804 of memory A. Accordingly, in the embodiment shown in FIG. 8, half of the virtual processors of the illustrated processor core 800 (virtual processors 1-8) are coupled to a dedicated memory A, which in this embodiment comprises 1 MB of storage of an eDRAM memory unit. Meanwhile, the other half of virtual processors (9-16) are coupled to a dedicated memory B, which also comprises 1 MB of an eDRAM memory unit. The total eDRAM provided on processor core 4800 is accordingly 2 MB.

Each virtual processor 802 accordingly is provided with a dedicated portion of its corresponding memory unit (memory A and memory B), and is also coupled to a shared search item database portion holding a portion of the search item database in that memory (memory A or memory B). In the embodiment shown in FIG. 8, the search item database portion of each of memory A and memory B includes approximately 300 search items (e.g. web pages) of data.

The embodiment shown in FIG. 8 may be designed for increased speed performance, at the expense of power savings. A total of 4 search processing modules, with a total of 16 processing cores per module, is contemplated for such a speed optimized search processing system. As shown in FIG. 8, each processor core 800 includes 16 virtual processors, for a total of 1024 virtual processors in this embodiment. Such a search processing system may be estimated to consume up to 7.2 watts for all 1024 virtual processors, which is about one third of that of an Intel CPU.

Each of the dedicated memories 810, e.g. Dedicated 1, shown in FIG. 8 may be implemented in the form of "stack" memory.

The embodiment shown, for example, in FIG. 6 includes a number of virtual processors (VPs) carrying out a number of threads that are sufficient to remove the performance penalty for memory access latency when the processors are coupled with the illustrative DRAM memory, and also to remove any need for pipeline flushes and branch prediction. In addition, the memory associated with the processors should have a sufficient number of banks and memory capacity within those banks, to provide higher memory access bandwidth including but not limited to one memory access per processor per cycle.

Power usage can be, in certain embodiments, optimized so that a low amount of power is need per megabyte and also so that a low amount of power is needed for per memory access. Connections between the local memory associated with processors 611 is preferably by low-power connections. Each of the low-power processors 611 may be connected to memory and/or to each other via a lower power on-chip network.

The total memory power usage and total processor power usage for a given node 610 could be made comparable to each other. For example, for a given node 610, the maximum or average power usage of the node's processors may be configured to be at a level close to a maximum or average power usage of the memory in that node.

The nodes (e.g., of FIG. 6) may be organized into node groups such that each node is a member of one group. Each group may be implemented in the form of an add-on card connectable to a standard interface of an existing PC. The node groups may be further organized so that multiple add-on cards could be used within one PC. A high capacity memory may be provided in a node, and associated with a particular group of processors. In one embodiment, this memory may be manufactured by using an optimized lithographic fabrication process on one die, while each of the processors associated with that memory may be manufactured using their own different optimized manufacturing process on their own die.

The chip dies of the processors and the memory associated with those processors may be joined together via 3-D (three dimensional) stacking.

The chip dies respectively for the processors and the high capacity memories associated with those processors may be joined by laying the dies flat side-by-side and connecting them to each other via very low-power connections in a package.

A given node, for example, node 610 shown in FIG. 6, may be further provided with a flash memory for seldom-used data storage.

The memory requested by the processors of a node (e.g., processors 611) can be requested in blocks of a size similar to the size of operands of a given processor 611. The memory may be requested in blocks of a size larger than the size of operands of a given node processor 611, to reduce the number of memory access and thus reduce power consumption.

Each of the low-power processors 611 can have an execution speed for a single virtual processing thread that is lower but more power efficient per memory access.

Each of the low-power processors may be further provided with an execution speed for a single thread that is slower but more power efficient per instruction execution.

The processors 611 can be optimized for high instruction throughput per watt by utilizing transistors optimized for low leakage current. The leakage current of the transistors may be decreased by increasing the proportion of time a transistor is actively switching and working toward instruction completion. The proportion of time that a transistor is actively switching and working toward instruction completion may be increased by increasing pipeline depth and further by increasing the number of virtual processors 612. In one embodiment, each of the processors 611 is configured to emulate a corresponding set of virtual processors by switching between each of its corresponding virtual processors in a round robin fashion.

A node 610 as shown in FIG. 6 can be further provided with a low-power implementation of instruction level parallelism (ILP) by bundling independent instructions into small groups at compile time.

A low-power implementation of ILP may bundle independent or dependent instructions into small groups at compile time. This may be done while masking any increased instruction latency or pipeline depth by adding virtual processors and by reducing the speed of all virtual processors so that their aggregate speed still equals the total real processor speed for the processor 611 corresponding to those virtual processors.

A given node 610, for example as shown in FIG. 6, can be provided with a very small low-power data cache on the same chip as the processors of that node. The virtual processors 612 that correspond to a given processor 611 may be allowed to communicate with each other (and/or to other nodes) via such a very small local cache.

Real-time applications can be executed utilizing fixed speed instruction throughput per virtual processors 612.

A node network, for example, as shown in FIG. 6, may be optimized for small communication buffers by utilizing a non-blocking low-latency switch. Such a node network optimized for low power may be further optimized by segregating nodes into hierarchically organized local groups.

A given high capacity memory provided on a node 610 may be optimized for low power usage during idle (standby) phases when no new memory accesses are made.

As noted above, if the processors and the corresponding memory are provided on separate dies, those dies may be joined together via 3-D (three dimensional) stacking. In the alternative, those dies may be joined together by lying them flat side-by-side and connecting them via very low-power connections in the same package.

A given node can be provided with flash memory for seldom-used data storage with no power cost.

The high-density memory can be implemented as DRAM.

The node architecture can be designed such that the memory is requested by a given processor, in blocks of a size similar to the size of operands of the given processor. The requested blocks may be of a size larger than the size of operands of the processor to reduce the number of memory accesses and thus reduce power consumption.

Per one embodiment, memory requests can be in blocks of 32 bits. Alternatively, in accordance with another embodiment, memory request may be in blocks of 64 bits.

The node architecture can achieve a parallel operation designation via a user indication of threads able to operate in parallel.

The overall system can be provided with a network bandwidth allocation for low-power via hierarchical connections. The hierarchical network bandwidth allocation may be such that the aggregation of search results is uninhibited.

The system can support high-speed communication between nodes via a high-speed non-blocking switch. Networking elements may be low-power relative to the power usage of the nodes being networked.

The node architecture can be designed such that the execution speed of any single thread corresponding to a virtual processor is about a hundred times slower than a typical commodity processor but about twenty times more power efficient per memory access than the typical commodity processor.

The system can be designed so that the node architecture has an execution speed for any given single virtual processing thread that is about a hundred times slower than a typical commodity processor but about 20 times more power efficient per instruction execution.

In this embodiment, referring to FIG. 7, 90 nodes are provided on a given module 702 (a single printed circuit board), and they are implemented using embedded DRAM for memory. Memory is provided on each processor core, on the same die as each processor. The eDRAM may be optimized for low-power per memory access. For example, 8 megabit banks may be provided in 90 nm technology at 166 MHz using 32 bit or 64 bit words occupying approximately 3.25 millimeters squared of area, and using approximately 25 milliwatts during active use and about 1000 times less during standby.

Two of these banks may be provided on a given processor core 704, and the associated processor may have a clock rate of approximately 333 MHz, which would require a use of about 0.5 millimeters squared of silicon area and consume about 40 milliwatts of power in 90 nm technology.

Therefore, 32 processor cores configured in this manner along with 64 banks of eDRAM may fit in less than 250 millimeters squared of chip space, while consuming approximately 3.7 watts.

The processor cores of this set of 32 can communicate with each other over a shared bus, e.g., that can be adapted to communicate off-chip messages via a conventional networking arrangement such as Infiniband or a gigabit Ethernet.

Each 333 MHz processor of such an embodiment can include sufficient logical processors (for example, virtual processor threads) to hide memory latency and pipeline depth.

When using eDRAM in a five stage pipeline, the pipeline significantly contributes to the number of desired logical processors per regular processor. Ten virtual processors operating logically at 33 MHz each may be implemented by each real 333 MHz processor. Ten virtual processors are referenced in this example because this number relates to the exemplary number of stages in the pipeline—and this is one factor in the number of virtual processors provided. For example, in the case of a 5-stage pipeline, there would be provided 5 virtual processors (each operating at 66 MHz to total 333 MHz in this example) to hide the pipeline stages. However, in the case where the total memory bandwidth (in this case 333 MHz provided by two 166 MHz banks) is equal to the total number of virtual processors (the most efficient case), the number of virtual processors should be divisible by the number of memory banks (otherwise the respective threads are not interleaved properly). It follows that, because 5 is not divisible by 2, and the arrangement requires at least 5 virtual processors to hide the 5 pipeline stages, then 6, 8, 10, or more, virtual processors can be employed. Six processors would be the desired choice if the goal is to reduce the amount of registers required by the architecture (since each virtual processor requires its own set of registers, and these registers have a constant power cost). However, using at least 10 virtual processors allows insertion of additional waiting stages, lengthening the number of stages between the beginning of a memory access and the time at which the result is expected, thus supporting higher latency memory.

In this implementation, each processor would have access to memory each cycle. Each group of five processors may use the same memory bank in one embodiment, and share this memory, since there would be no power efficiency penalty for doing so. The processors could execute multiple compile time group instructions, while no out-of-order operation or speculative execution would be performed.

Another algorithm well-suited to the novel architecture is financial algorithms using Monte Carlo simulation. These algorithms require random numbers as input, which can be time consuming to generate, but by storing many of these numbers locally in the DRAM memory they are easily accessible to a process (using much lower power than if they had to be regenerated). During a financial Monte Carlo simulation, the same code may be executed millions or billions of times, with the only modification between runs being the input random number. This extreme number of samples is necessary because (1) the precision of the final answer must be within some fraction of a cent, and the total dollar value of the final answer may be thousands, requiring 7 or more digits of precision; and (2) the precision of the final answer grows slowly, as the square root of the number of samples. For some algorithms, output of these runs must be averaged or summed, such that the final answer is the average of billions of individually derived numbers. During each Monte Carlo sample, a complicated function such as "exp" (raising the natural number e to the input power) can take multiple cycles to execute. Interestingly, because the final result of the simulation is the average of so many numbers, reducing the precision of this function (the number of decimal places of required accuracy) may not significantly impact the final answer. Instead of calculating the exp function directly, in this case it is possible to use a small lookup table with perhaps 12-bits of accuracy at the input and 12-bits at the output. Because of the significant local storage for each process in the novel architecture it is likely that such tables would be quickly accessible to each process. If stored in the most local DRAM memory the exp function could be completed in a single cycle via table lookup.

Note as used herein, the term "random number" contemplates not only a computer-generated number, but a manually generated number and/or a list of manually generated numbers—among other techniques for generating arbitrary values.

Figure 9:
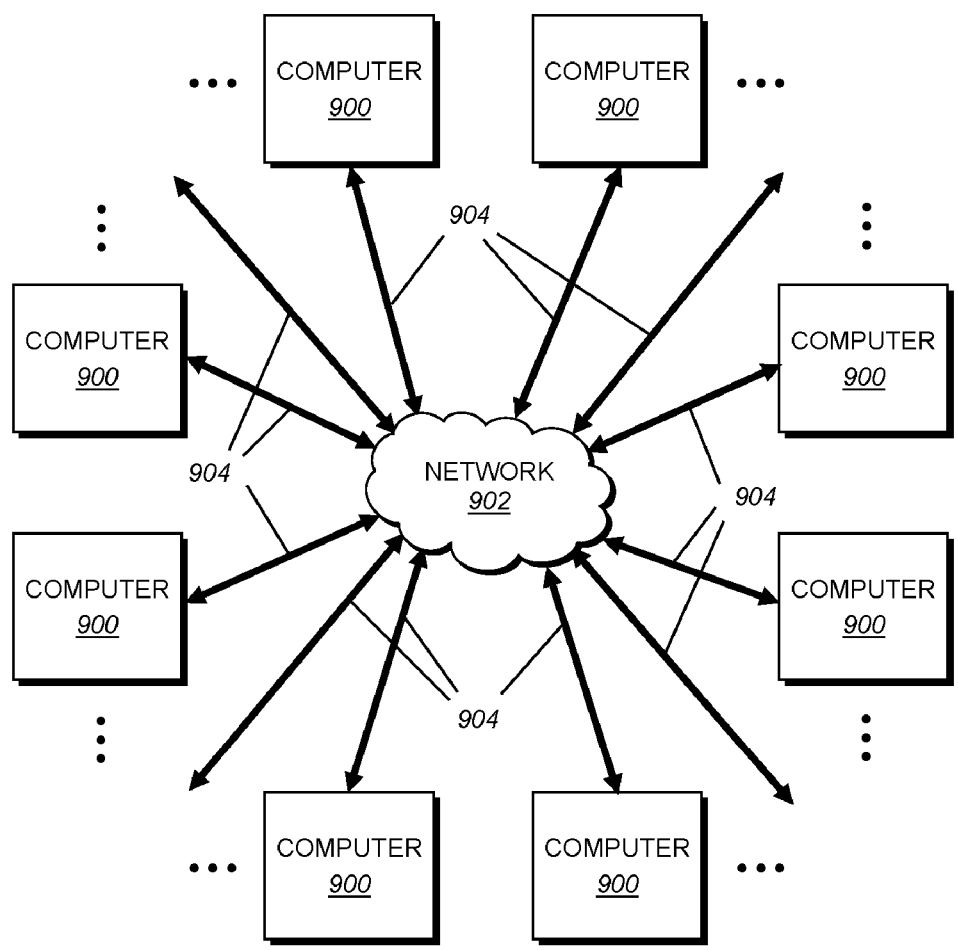
FIG. 9 is a block diagram of an exemplary parallel processing computer cluster.

Notably, FIG. 9 is a computer cluster comprising a collection of interconnected computers that together serve as a type of supercomputer useful for applications in need of high performance such as Search Engines, Financial Analysis, and Weather Prediction. As shown the depicted, exemplary computer cluster comprises many computers 900, each with a network interface 1004 (FIG. 10), connected to a "wire" which may be copper or fiber optic 904. The computers 900 can be x86-compatible desktop computers all mounted in the same or nearby racks in a datacenter. It is also possible for a computer to be very small, for example a single 10 mm by 10 mm flat chip in a package, possibly with no cooling depending on heat production. The wire 904 may be Cat6 Ethernet wire, and the network 902 may include routers implementing an IP protocol, thereby allowing the computers 900 to communicate using UDP or TCP/IP protocols. The network also comprises networking elements such as switches and routers that pass messages between computers based on the destination address of the message. Cluster applications run programs on each computer, each program performing a different sub-task of the overall application. Not all applications benefit from cluster hardware, because an application must use parallel algorithms to execute on multiple computers, and not all tasks can be separated into parallel sub-tasks.

Figure 10:
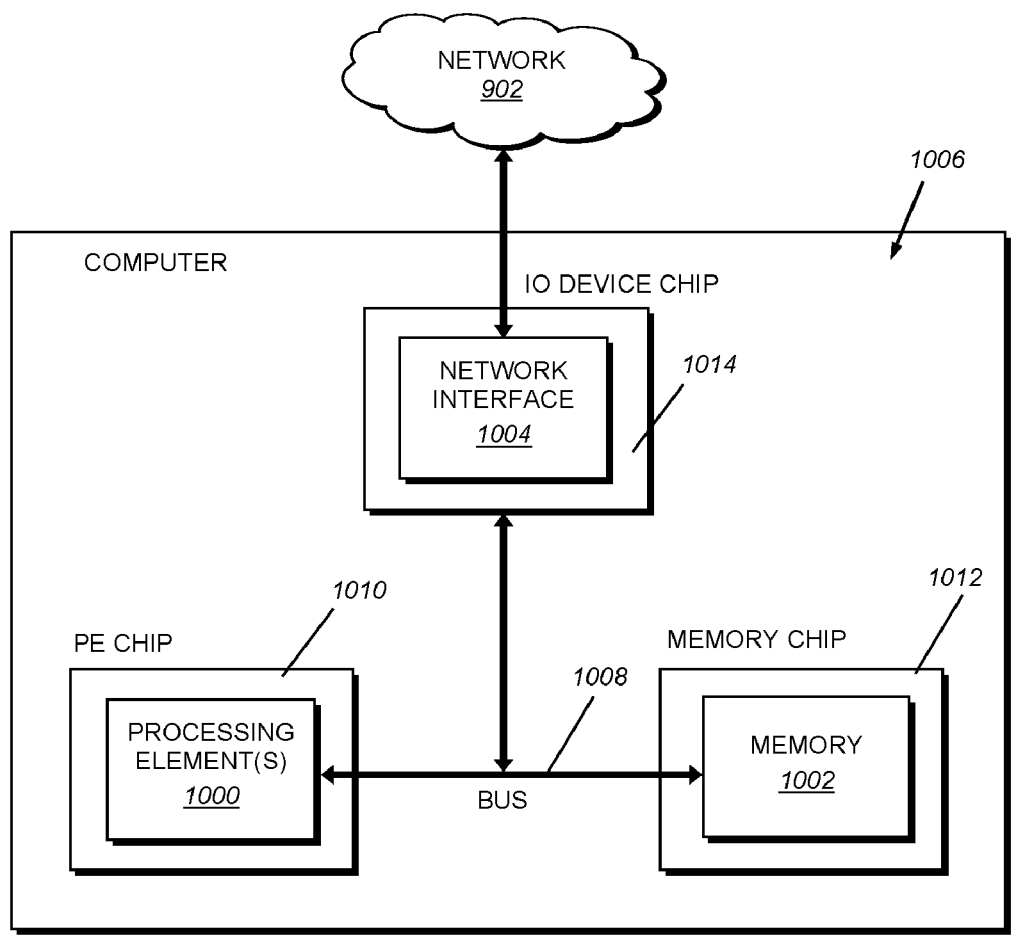
FIG. 10 is a block diagram of an exemplary computer provided with power-efficiency-enhanced processor core chips according to an illustrative embodiment.

FIG. 10 is a block diagram of a computer 1006 such as might be used in a high-performance cluster as described in embodiments herein. The illustrated computer includes processing elements, memory 1002 and a network interface 1004, all interconnected via a bus 1008. Buses 1008 are typically slower in transmission speed than on-chip buses or networks, and their power-efficiency is typically rated in gigabits per second per milliwatt. In contrast on-chip communication requires orders of magnitude less power to achieve the same performance and is much lower latency, due to the shorter wire length and lack of transition between on-chip and off-chip wires.

When using separated chips for elements 1000, 1002, and 1004, there is a minimum power usage that can be attained for given inter-chip communication requirements, and this could in fact be much higher than the sum power usage of a highly efficient PE chip 1010, memory chip 1012 and network interface chip 1014 implementation.

Figure 11:
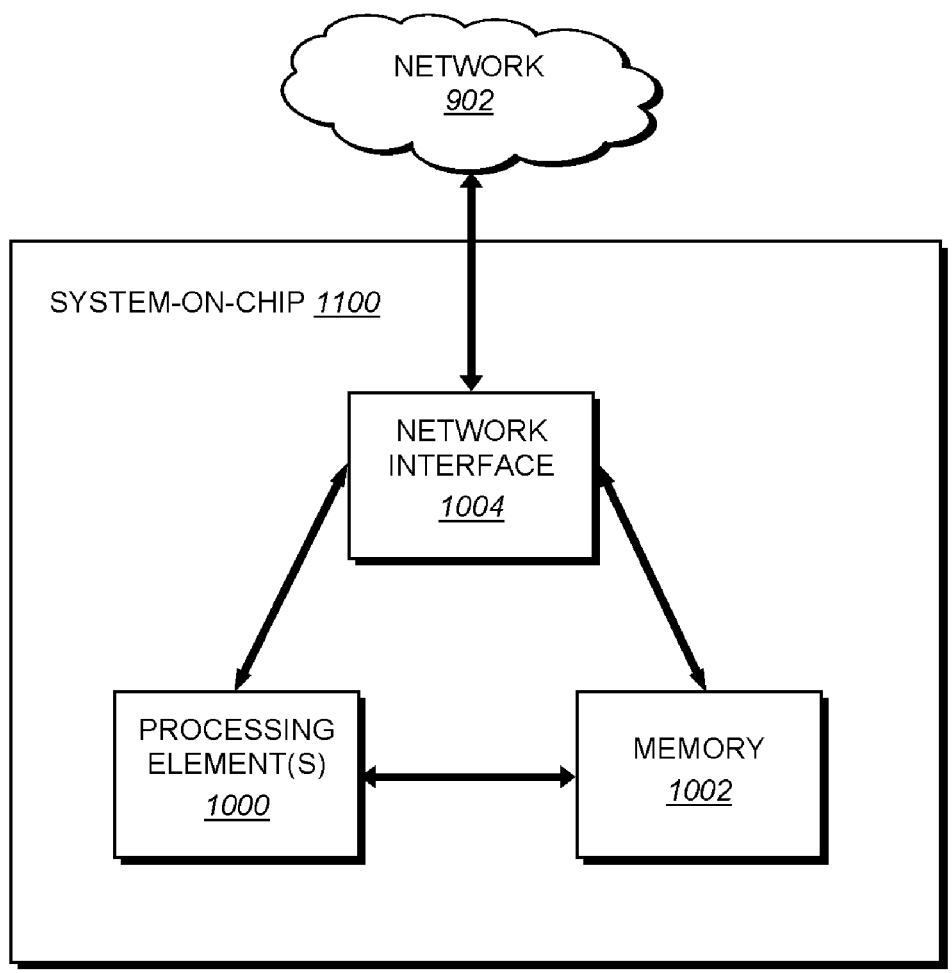
FIG. 11 is a block diagram of a system-on-chip embodiment of a power-efficiency-enhanced computer architecture according to an illustrative embodiment.

FIG. 11 is a block diagram of a system-on-chip 1100 computer architecture containing processing elements 1000, network interface 1004 and memory 1002 all on the same chip. The network interface 1004 connects the system-on-chip 1100, which can also be called a computer, to a cluster of system-on-chips 1100. The illustrated system-on-chip 1100 architecture uses a single network interface for all external communication, and therefore includes sufficient memory 1002 on chip to maintain good performance. The precise quantity of memory 1002 needed on chip is algorithm dependent. System-on-chips may be practically limited to approximately 100 or 200 square millimeters of chip area when using conventional packaging techniques. For the design of a cluster of system-on-chips, the improved power efficiency of on-chip communication encourages using a larger chip size so that less off-chip communication is necessary.

Figure 12:
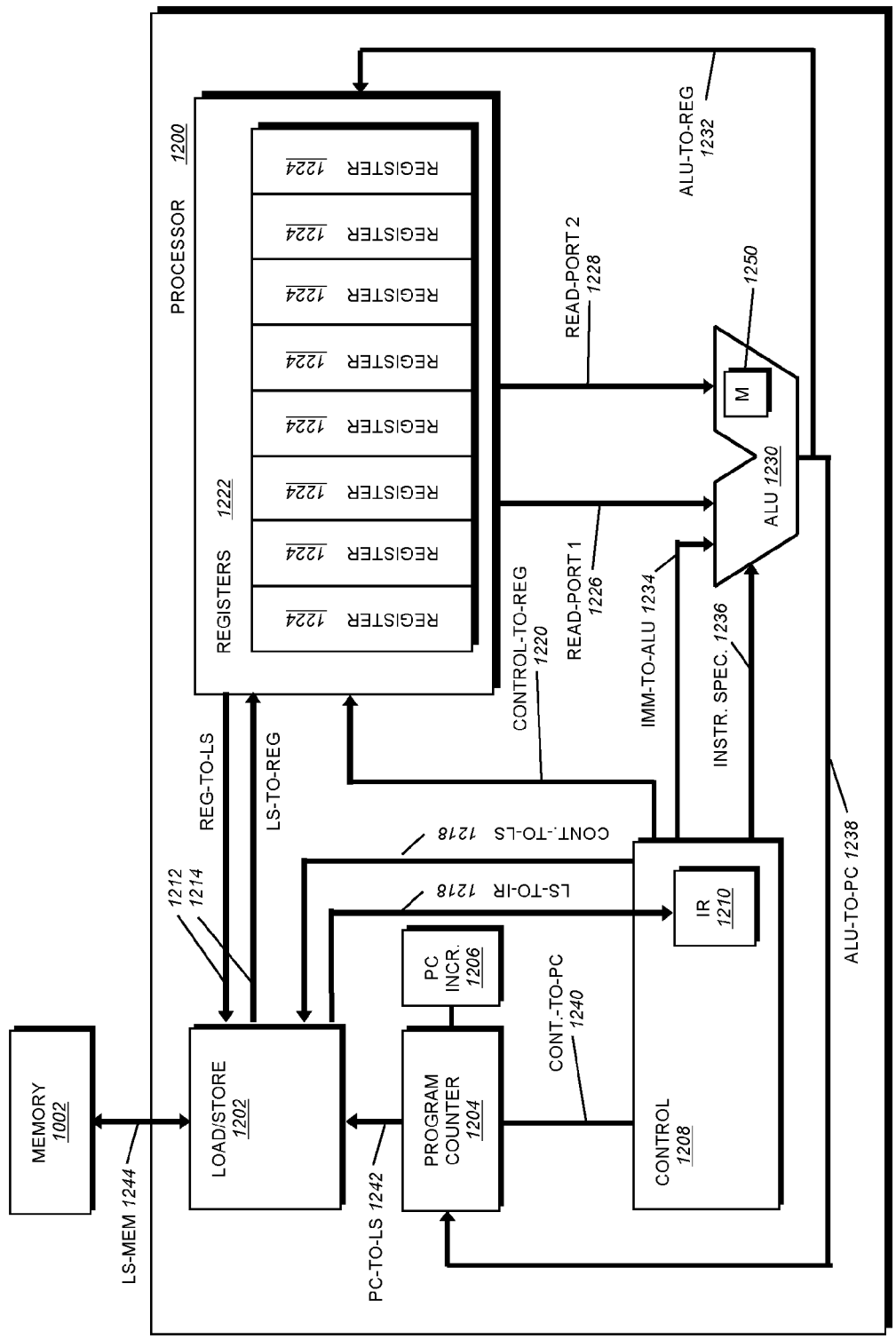
FIG. 12 is a schematic diagram of a basic processor architecture that can be employed in an illustrative embodiment.

FIG. 12 is a block diagram of a basic processor architecture 1200 from which processors as described herein can be implemented. Program execution proceeds by iteratively completing the instruction cycle. The instruction cycle proceeds through several steps and in an illustrative example this could be said to be 6 stages comprising: 1) Instruction Fetch 2); Increment PC; 3) Decode instruction; 4) Dispatch register operands; 5) Execute instruction; and 6) Write results. Instruction Fetch loads the next instruction in the program from memory 1002. This is involves the Control unit 1208 communicating to the Program Counter 1204, or PC unit, via the Control-to-PC pathway 1240. This communication tells the PC 1204 to send the current value of the PC 1204 to the Load/Store unit 1202.

The PC value designates the memory address necessary to locate the next program instruction from memory 1202. The PC unit 1204 then sends the PC value 1242 to the Load/Store unit 1202 via the PC-to-Load/Store pathway 1242. The Control unit 1208 then signals to the Load/Store unit 1202 via the Control-to-Load/Store pathway 1216 to use the PC value to read the next instruction from memory. The Load/Store unit 1202 then sends a read command to the memory unit 1202 via the Load/Store-Memory pathway 1244 indicating the PC value as the address to be read.

The memory unit 1002 then retrieves this value from its internal circuits and returns data representing the next instruction to the Load/Store unit 1202 via the LS-Mem pathway 1244. The Load/Store unit then sends the instruction data to the Instruction Register 1210, also called IR, via the Load/Store-to-IR pathway 1218. This is the end of the Instruction Fetch stage. Only the Control 1208, IR 1210, PC 1204, Load/Store 1202 and Memory 1002, as well as the necessary pathways (1240, 1242, 1244, 1218, 1216) were used during the Instruction Fetch stage. All other units (1212, 1214, 1220, 1234, 1236, 1226, 1228, 1232, 1238, 1224, and 1222) in the processor 1200 will be used in a future stage of the Instruction Cycle but they did not perform any useful operations during the Instruction Fetch stage and were merely idling in the naïve processor architecture.

The next stage is the Increment PC stage, in which the PC 1204 communicates to the PC Increment unit 1206 so that the value of the PC is incremented to the address of the next instruction in memory 1002 by the PC incrementer 1206. Besides these two units and their connecting pathway, no other processor units were involved in completing the Increment PC stage. The Increment PC stage does not have to occur immediately following the Instruction Fetch phase, and is performed after the Instruction Fetch stage and before the Write Results stage.

The next stage of the Instruction cycle is the Decode Instruction stage. In this stage the Control unit 1208 reads the bits in the instruction register 1210 and prepares to send the proper signals to the other units in the processor 1200 necessary to perform the instruction. Besides these two units no other units were contributing to the Decode Instruction stage and were waiting for a future stage.

The next stage is the Dispatch Register Operands stage. First we will consider the case where the instruction can be performed by the ALU. This stage proceeds by the Control unit 1208 signaling to the Registers unit 1222 over the Control-to-Registers pathway 1220 to send data from a particular register 1224 that was indicated in the current instruction to be an operand to the ALU 1230 over a particular port, either Read-port 1 1226 or Read-port 2 1228. If the instruction has two operands stored in registers, the signal sent from Control 1208 to Registers 1222 will also specify a second Register 1224 to be sent over the other Read port. Alternatively, the Control unit 1208 may provide an operand contained within the Instruction data, called an Immediate, over the Immediate-to-ALU pathway 1234. Instructions may specify either zero, one, or two operands. In the case of a single operand the operand may be either an immediate or a Register 1224 operand. In the case of two operands, the two operands may be provided in two Registers 1224, or a single register 1224 and a single Immediate.

If the instruction does not have any operands, a signal would not be sent to the Registers (1222) and no immediate value would be sent to the ALU 1230. When the Registers 1222 receive a signal to send operands to the ALU 1230 they send these to the ALU 1230 over the ports designated in the command from the Control unit 1208. As with previous stages in the Instruction cycle, many portions of the processor 1200 and the memory unit 1202 spend the Dispatch Register Operands stage idling.

In the event that the instruction is not an ALU 1230 instruction but instead a memory operation, the operand(s) will be sent to the Load/Store unit 1202 over the Register-to-Load/Store pathway 1212. In the case of a READ memory operation, the control unit 1208 will also indicate the destination register 1224 for the result to be sent to.

The next stage is the Execute Instruction stage. First, the case is considered where the current instruction is an ALU instruction 1230. During this stage the Control unit 1208 specifies the operation designated in the current instruction to the ALU 1230 over the Instruction Specification pathway 1236. The Control Unit also sends the ALU 1230 the destination to which the result should be sent during the Write Result stage that will follow. The ALU 1230 then performs the operation and computes the result.

In the case that the current instruction is not an ALU 1230 instruction but a memory instruction, the Control Unit 1208 sends a signal to the Load/Store unit 1202 to perform a read or write memory operation as designated by the current instruction. The Load/Store unit 1202 then sends the command to the memory unit 1002 with the data supplied by the Registers 1222 during the previous stage. If the memory operation is a write command, the data provided by the Load/Store unit 1202 designate the memory address to write to and the value to be written there. The memory unit 1002 will then write the data to that location in its internal circuitry. If the memory operation is a READ operation, then the Load/Store unit 1202 designates the location of the data to be read, which the Memory 1002 unit then retrieves from its internal circuitry and sends back to the Load/Store unit 1202 over the Load/Store-Memory pathway 1244.

In the next and final stage of the Instruction Cycle, results are written to the destination indicated in the current instruction. For ALU 1230 instructions that are not JUMP or BRANCH instructions, the ALU 1230 will send the computed result to the Register 1224 previously indicated by the Control unit 1208 over the ALU-to-registers pathway 1232. In the case that the current instruction is an ALU instruction 1230 that is a JUMP or BRANCH instruction, the result will be written to the PC 1204 through the ALU-to-PC pathway 1238, thus changing which instruction will be fetched at the beginning of the next Instruction Cycle. In the case that the instruction is a memory READ instruction, the Load/Store unit 1202 will send the previously retrieved data to the appropriate register 1224 over the Load/Store-to-Register pathway 1214, specifying which Register 1224 gets the data as previously indicated by the Control 1208 unit.

Figure 13:
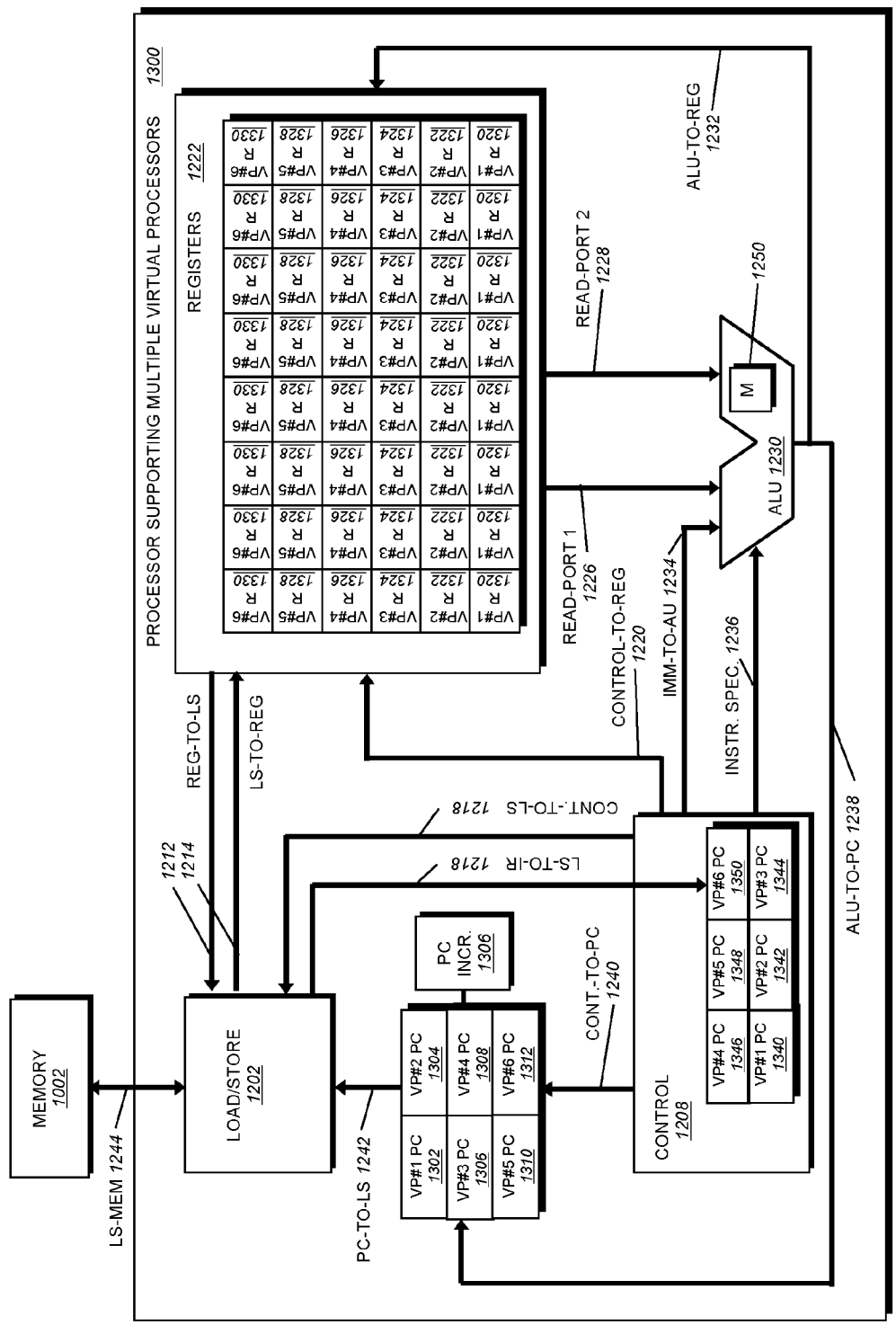
FIG. 13 is a schematic diagram of an illustrative processor implementing multiple virtual processors according to an illustrative embodiment.

FIG. 13 is a block diagram of a processor implementing multiple virtual processors 1300 which differs from FIG. 12 in that there are separate resources provided to each virtual processor such as a PC 1204, Instruction Register (IR) 1210 and a set of data registers 1222. This architecture 1300 implements separate instruction cycles for each virtual processor in a staggered fashion such that at any given moment exactly one VP is performing Instruction Fetch, one VP is Decoding Instruction, one VP is Dispatching Register Operands, one VP is Executing Instruction, and one VP is Writing Results. Each VP is performing a step in the Instruction Cycle that no other VP is doing. The entire processor's 1300 resources are utilized every cycle. Compared to the naïve processor 1200 this new processor could execute instructions six times faster.

As an example processor cycle, suppose that VP#6 is currently fetching an instruction using VP#6 PC 1312 to designate which instruction to fetch, which will be stored in VP#6 Instruction Register 1350. This means that VP#5 is Incrementing VP#5 PC 1310, VP#4 is Decoding an instruction in VP#4 Instruction Register 1346 that was fetched two cycles earlier. VP #3 is Dispatching Register Operands. These register operands are only selected from VP#3 Registers 1324. VP#2 is Executing the instruction using VP#2 Register 1322 operands that were dispatched during the previous cycle. VP#1 is Writing Results to either VP#1 PC 1302 or a VP#1 Register 1320.

During the next processor cycle, each Virtual Processor will move on to the next stage in the instruction cycle. Since VP#1 just finished completing an instruction cycle it will start a new instruction cycle, beginning with the first stage, Fetch Instruction.

A small flash memory could be made to reside adjacent to the system-on-chip 1100 or inside the system-on-chip. Flash memory provides the advantage that it can be completely turned off (thus, consuming no power) and still remember its stored data when turned back on, which is called persistent data. Such data is useful for storing seldom-accessed data such as boot-loading instructions.

Having described one type of processor capable of performing a large number or parallel processes at a predetermined level of precision, an illustrative embodiment of the system and method for implementing Monte Carlo processes using a combination of high-precision and low-precision computations as generally contemplated by FIG. 5 and the description thereof is now described in further detail.

III. System and Method for High/Low-Precision Computations

With reference to FIGS. 12 and 13, the ALU 1230, is provided with multiplier M 1250 that is typically lower in precision (i.e. bit value) that those of typical general purpose processors. For example, multipliers employed in a conventional core 2 Intel processor can contain a 64-bit multiplier, while the multiplier M 125 can define a 32-bit, or even a 16-bit multiplier. The lower-precision multiplier allows for lower power consummation, but inherently limits computational precision without the use of software-based higher precision multiplier functions that allow for iterative use of a lower-precision multiplier on each of various parts of a computation until the full bit-value of the desired precision is completed. Note that various conventional processor can contain both a low-precision and high-precision multiplier, while the illustrative architecture typically contains only the low-precision multiplier. One open source software-based program for achieving high-precision computations with a lower-precision multiplier is SoftFloat, available from John R. Hauser via the World Wide Web address http://www.jhauser.us/arithmetic/SoftFloat.html.

Note also that the term "low-precision" can more generally refer to a range of bit values that are typically smaller than the corresponding "high-precision" bit values. For example, low-precision bit values can be 8-bits, 16-bits, 32-bits, or another size. High-precision values can be 32-bits (particularly where the low-precision value is less than 32-bits), 64-bits, 80-bits or another desirable size. High-precision can be alternately defined (illustratively) as single precision, while low precision is defined as half-precision. Other relative sizes are also expressly contemplated where the high-precision bit value is generally smaller than the low-precision bit value.

Figure 14:
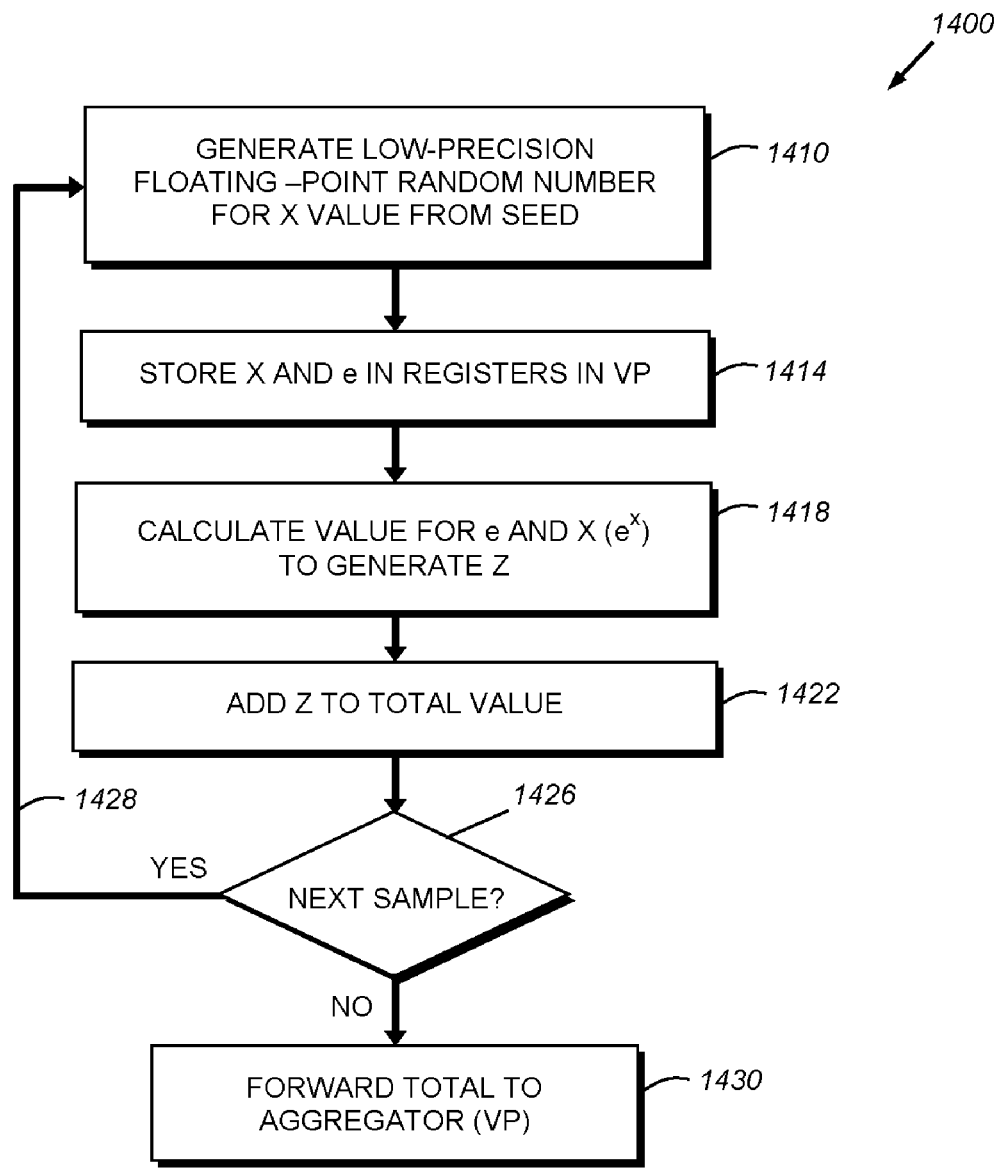
FIG. 14 is a flow diagram of a procedure for computing an iterative series of low-precision sample values from random numbers for use in a simulation.

With reference to FIG. 14, a procedure 1400 adapted to run on the above-described processor arrangement, or a similar arrangement, for conducting low-precision/high-precision Monte Carlo (or other iterative sampling) computations is shown and described. In one example, eight virtual processors on a chip core are employed for the procedure 1400, therein avoiding moving the data produced by the procedure off-chip (which occupies inter-core/chip, bus-based communication overhead), until a downstream computation of an aggregate of values is required (as described below). The procedure 1400 runs during a simulation, in parallel on each of the virtual processors in a core (seven processors out of the eight as described below), and initially obtains seed numbers that allow for randomization. The generation of random numbers can be accomplished using the well-known ziggurat algorithm or another appropriate application. Typically, these numbers allow the process to generate a 32-bit or less floating-point value as shown in step 1410. The value, termed x is stored in an appropriate register in a virtual processor as described above in step 1414. The well-known value e is also stored in a register of the VP. Alternatively other values can be stored for use in a computation, such as a generalized value y. Note that by using a 32-bit path, a processor can support two simultaneous 16-bit floating point numbers handled at once using a conventional 16-bit floating point routine in an alternate embodiment. According to step 1418, the value for x is applied to the exponential function $e^x$, or otherwise combined, to generate a new value, z. The value for z is added to a total value to generate a new, updated total for values z in step 1422.

The sub-process of steps 1410, 1414, 1418, 1422 continues (via decision step 1426 and branch 1428), each cycle generating new random values for x and z, until a predetermined number of low-precision (32-bit or less) samples have been generated. This total is then passed to an aggregator in step 1430. In an illustrative embodiment one of the eight virtual processors on a given chip operates as the aggregator for that chip. In operation the aggregator sums the totals forward by step 1430 for each of the other seven virtual processors to generate an aggregated total for the eight virtual processors. The total, at various stages of aggregation (to be described below) is a sum for all virtual processors within a given grouping, of all samples. This sum is divided by the total number of samples at that stage to obtain an average value.

Figure 15:
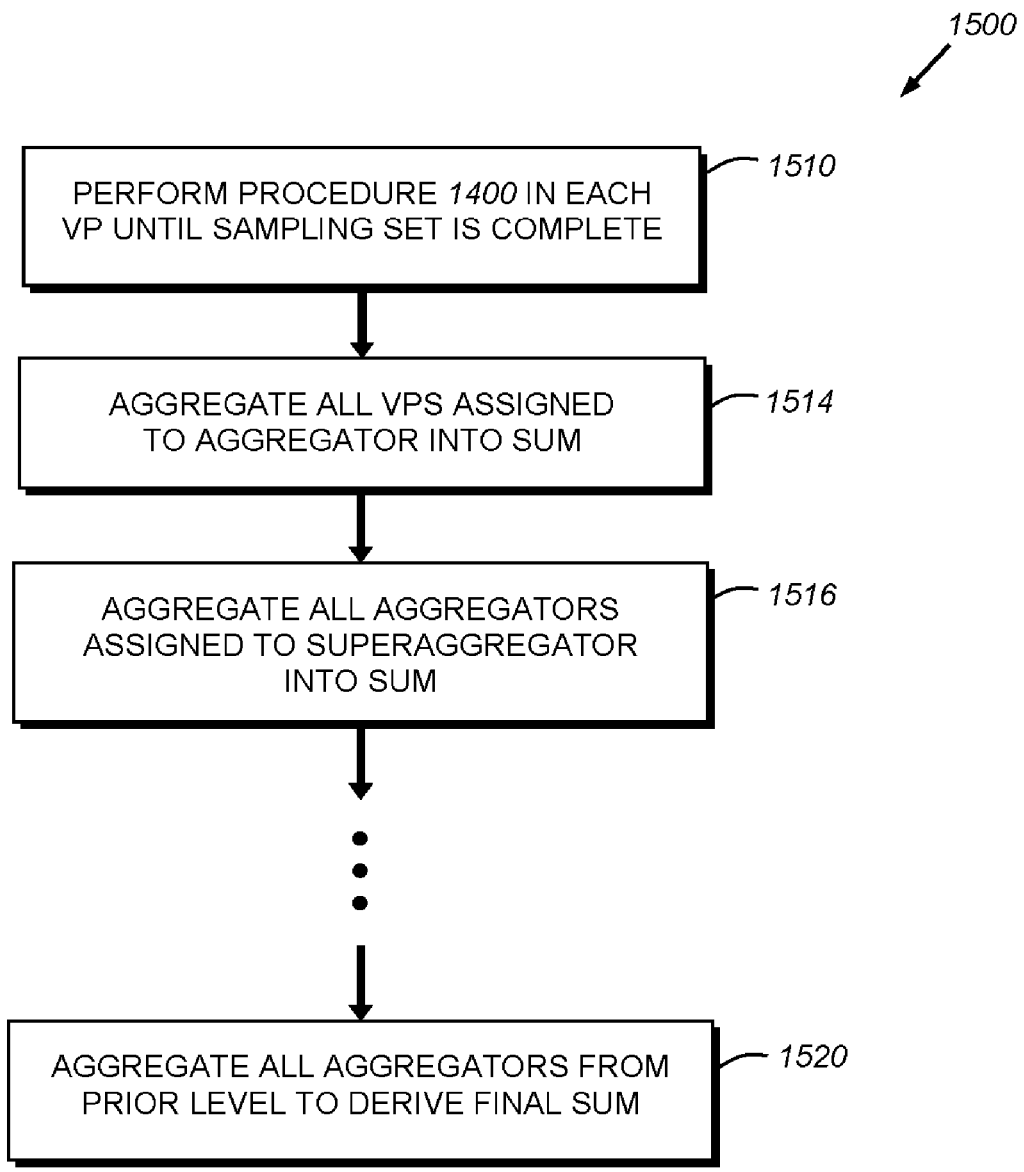
FIG. 15 is a flow diagram of a generalized procedure for aggregating totals of low-precision sample values through a plurality of aggregation steps culminating in a final sum of all computed values.

The overall computational process can take advantage of the layered hierarchy or virtual processors, cores, chips and host computers to allow parallel computations of samples to occur at the VP level, and then combine these sums in successively higher-level aggregation steps. As shown in FIG. 15, the general procedure 1400, shown in FIG. 14 is performed simultaneously across a large number of cores, chips and hosts in the overall computing array (step 1510 of the generalized process 1500). As the sums at the VP level are each aggregated by an assigned aggregator (a VP within the common core) in step 1514, the resulting aggregated sums can then be passed to a plurality of super aggregators, which can reside on the same core, chip or host (1516). A plurality of additional layers of super-super aggregators that reside at some location within the computing array (for example off-chip), and that are assigned to handle the prior level of super/super-super aggregators sum the values to produce the next level of aggregation until a final aggregator arrangement sums the aggregated value into a final aggregated sum (step 1520). Thus, aggregated sums are continually shifting up the line to a final aggregator through N levels of aggregation. The number N can be determined by the arrangement of the architecture and the speed of communication between various levels of the array. In general, the aggregators at each level are spread across cores, chips and hosts in the array in a manner that most efficiently handles the data traffic along various I/O buses, etc. Generally, each aggregator, at each level comprises one or more VPs capable of handling the desired precision. Note that the aggregators also function an illustrative embodiment to track the total number of values being summed. In this manner that total eventually allows averaging of the sum by the total number of summed values to occur. The tracking of total numbers of values can be accomplished in a variety of manners that should be clear to those of ordinary skill.

It is recognized that the adding operations performed by the aggregators occur with lower overhead than more-complex operations such as exponentiation. Thus, it is contemplated that the majority of exponentiation (and similar, complex/high-overhead operations) occur in lower precision (e.g. 32-bit) while the aggregation can be performed in a higher precision (e.g. 64 bit), without adversely affecting processing efficiency.

Figure 16:
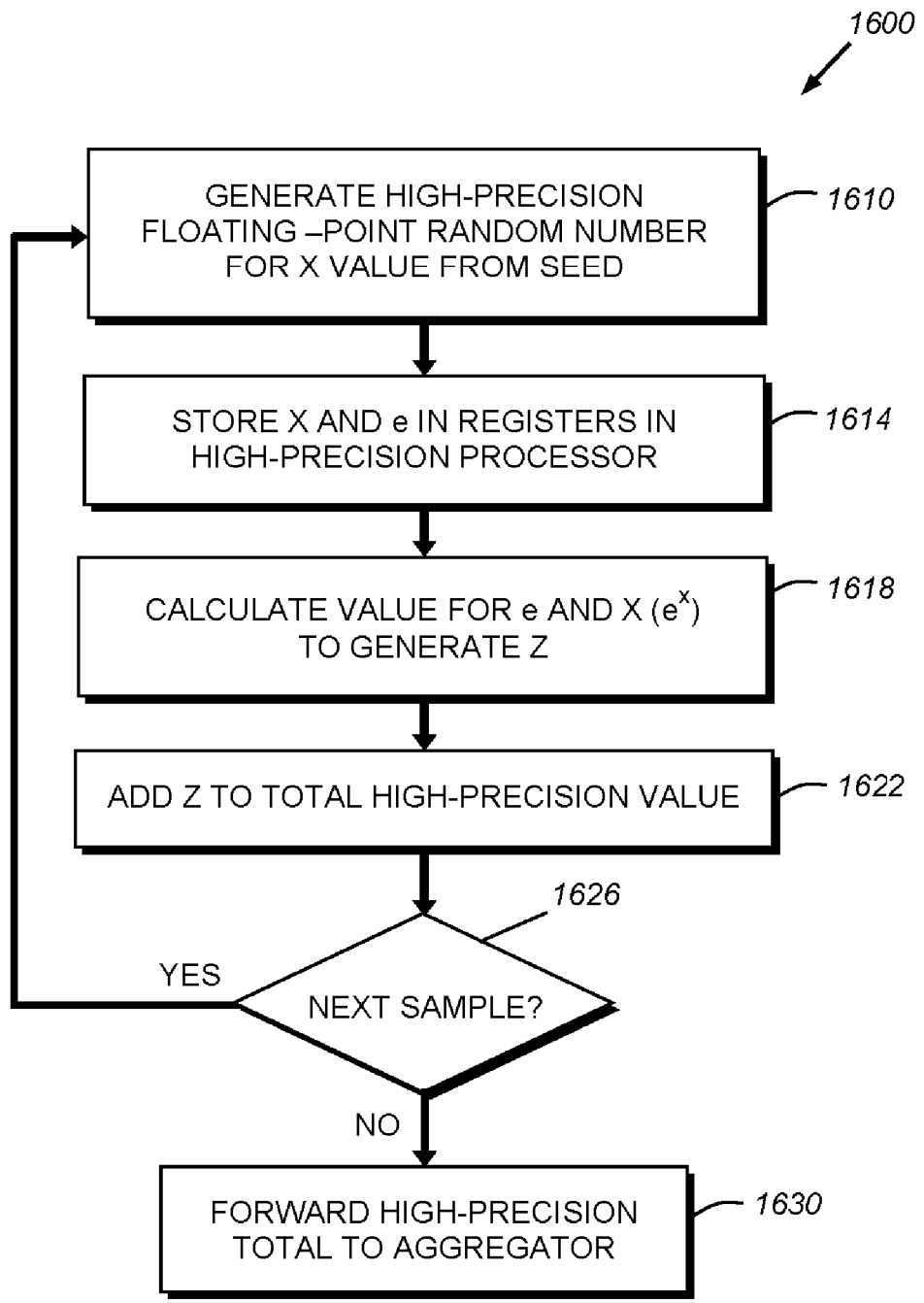
FIG. 16 is a flow diagram of a procedure for computing a smaller iterative series of high-precision sample values from random numbers for use in a simulation.

While the low-precision computations described in the procedure 1400 are carried out, there are simultaneous computations occurring at high precision, but using a substantially smaller number of processors. For example, for every 1,000,000 VPs performing the procedure 1400 in low precision, and eventually aggregating to a single sum via the final aggregator, a 1,000 processors (that may be part of the array or a separate computing system), compute similar samples using high-precision throughout the computation. These high-precision processors can be conventional general purpose processors in an illustrative embodiment, or a portion of the array. They can include a high-precision (e.g. 64-bit) architecture, or a lower-precision architecture that is made higher precision through software. As shown in FIG. 16, the high-precision procedure 1600 in step 1610 employs processors to generate high-precision floating point random numbers from the same seed as that used in low-precision 1400 (thereby avoiding a possible error). The high-precision x is stored in a register in conjunction with a stored high-precision e (or other value(s), y, etc.) in step 1614. A high-precision value z is calculated using stored x and e (e.g. $e^x$) in step 1618. This value z is added to the running total of high-precision values in step 1626. The process continues via decision step 1626 while samples remain to be processed. As a high-precision total value with a predetermined number of high-precision samples is derived, it is passed to the local aggregator in step 1630. Further layers of super aggregators, etc. can receive aggregated sums of high-precision values as described with reference to FIG. 15, until a high-precision process final aggregator generates a final high-precision sum. Because a substantially lower number (by several orders of magnitude) of high-precision computations occur relative to low-precision computations, the timing to complete such high-precision computations should be well within the completion timeframe of the corresponding low-precision. The result of the overall process is a high-precision sum and a low-precision (with high-precision significant trailing digits typically set to 0) sum that can be combined and averaged across the total number of discrete high/low-precision computations. Using the same random number seeds for high-precision and low precision calculations, the standard deviation (the basis for an accurate estimate) is relatively low, and the desirable estimation performance depicted in the graph 500 of FIG. 5 can be achieved in the final average.

Figure 17:
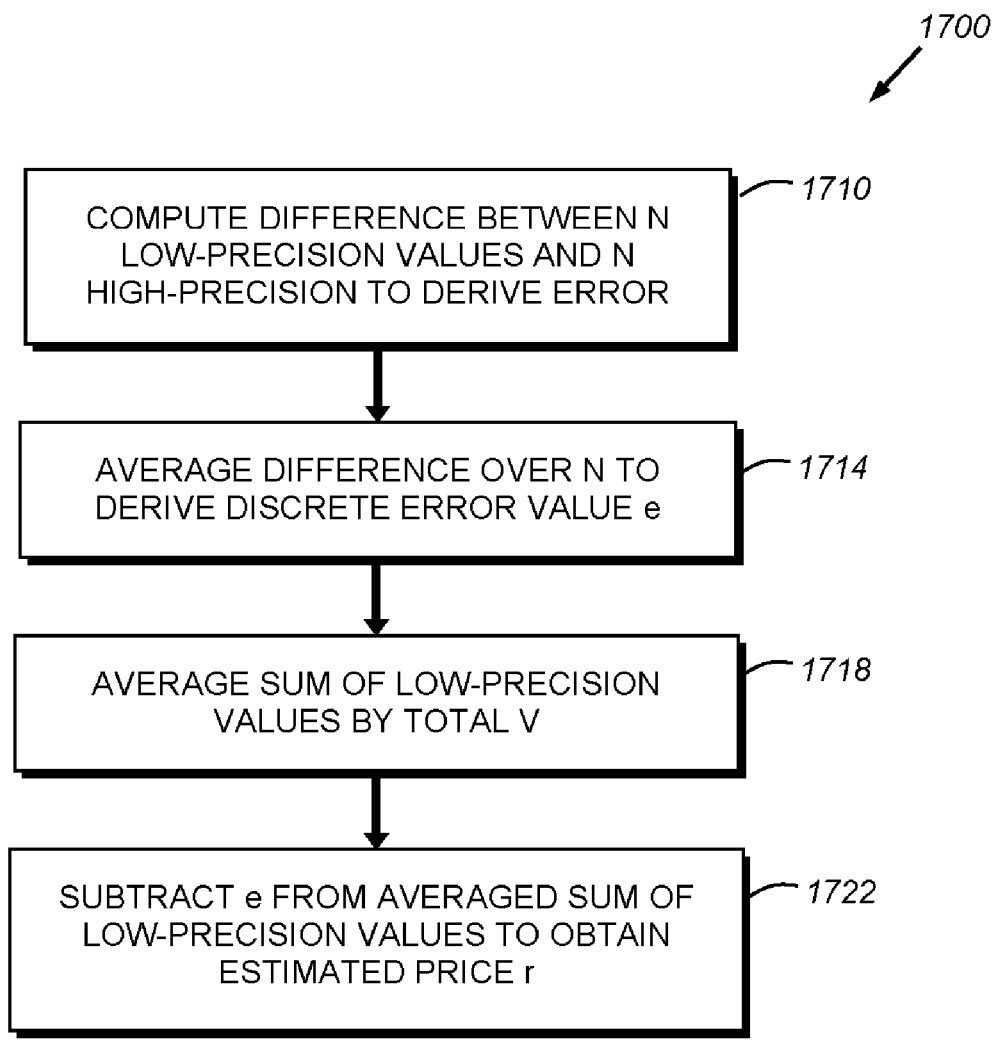
FIG. 17 is a flow diagram of a procedure for determining a final error value e between a number N of high-precision and low-precision sample values, and therefrom generating a final estimated value r.

In computing the error e, a high-precision processor is employed. By way of example, and as shown generally in the procedure 1700 of FIG. 17, the error is computed by calculating the difference between the sum of a predetermined number of low-precision values and the sum of the predetermined number N of high-precision values (step 1710). This sum is averaged over the number N of values used to derive the error value e (step 1714). For example, 1000 high-precision and 1000 low-precision values are used (in this case providing a fairly stable statistical basis the real error value), and averaged over 1000. Then, in step 1722, the error value e is subtracted from the averaged sum of the total number V of low-precision values, after averaging by V (step 1718) to obtain the final estimate r.

In an embodiment, the high-precision process 1600 can be implemented by a computer array comprising conventional (general purpose, and typically (but not necessarily) high-precision) processors, such as Intel Core2™ or QuadCore™ units, which inherently perform high-precision processes effectively. This arrangement, in effect, can be arranged as a high-precision platform operating a parallel low-precision coprocessor. Alternatively, high-precision computation can be performed in an alternate computing structure, including the low-power array using software-based high-precision computation process.

It is contemplated that during a low-precision process, the discrete sample values can vary by many orders of magnitudes within a given simulation. Note that the running total eventually grows significantly larger than any individual sample so the that the embodiment described below details a technique for avoiding precision loss by avoiding summing such numbers. By way of example, one sample S1 can have a value $1.5 \times 10^3$ while another sample S2 can have a value $1.5 \times 10^{15}$. Adding these two values in low-precision may result in the loss of S1 due to lack of sufficient significant digits and the 12 orders of magnitude difference therebetween. In accordance with an illustrative embodiment, an adding tree can be employed to cluster sample values within a smaller range of magnitudes and thereafter aggregate such values to generate a sum that includes all samples without truncation of any significant digits thereof. By way of example S1=$1.5 \times 10^3$ and S3=$1.2 \times 10^4$, while S2=$1.5 \times 10^{15}$ and S4=$1.3 \times 10^{12}$. Thus, the procedure is adapted to store like-magnitude values and sum them such that Sample A=S1+S3+ . . . and separate Sample B=S2+S4+ . . . . The (A, B, etc.) grouping in which samples are placed is governed by predetermined limits the range of orders of magnitude between the summed samples. Likewise, Samples C and D can each represent differing ranges of value. These samples are then summed to eventually group A+B=E and C+D=F, and then E+F=G, and so on. In this manner, the number of summed samples remains in the range of the low-precision significant digits without losing substantial precision. The use of an adding tree desirable enables low-precision computations to be aggregated throughout more stages of the low-precision process (1400).

Figure 18:
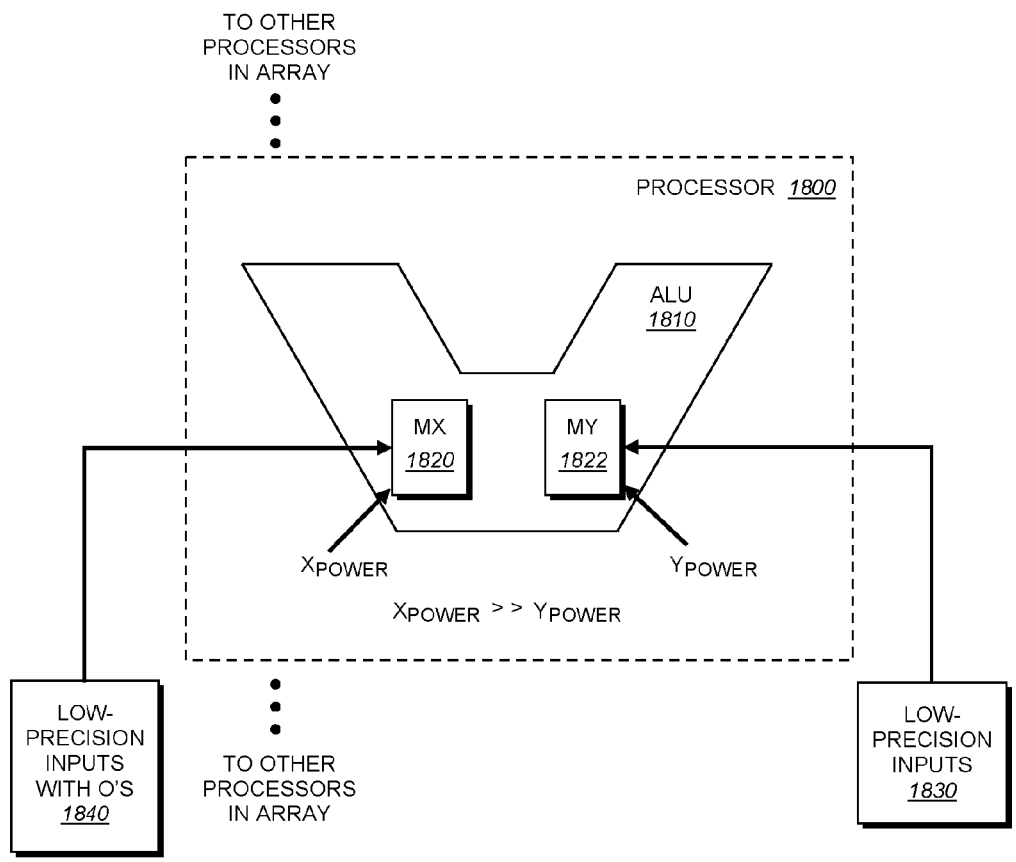
FIG. 18 is a block diagram detailing an ALU of a conventional processor containing a high-precision multiplier and a low-precision multiplier, wherein an illustrative embodiment of the procedure for computing low-precision sample values adapted to occur using low-precision inputs on the low-precision multiplier and/or with trailing zeroes for a portion of the inputs on the high-precision multiplier.

FIG. 18 refers to an alternate embodiment, in which conventional processor architectures are employed in an array. As shown, an exemplary processor 1800 can contain an ALU 1810 having both a high-precision multiplier MX 1820 and a lower-precision multiplier MY 1822. A variety of conventional processor architectures can be employed, including relatively low-speed Intel X86, single-core designs. The multiplier MX, MY selected for a particular operation is selected based upon instructions in the code (e.g. multiply single or multiply double for MX or MY, respectively). The find-and-replace embodiment for replacing double-precision with single-precision code statement can be employed to modify an existing C-code (or similar) instruction set to provide the desired multiply single instructions. The high-precision multiplier typically consumes $X_{POWER}$ when performing a high-precision calculation, while the lower-precision multiplier consumes $Y_{POWER}$ during an operation, where typically $X_{POWER} \gg Y_{POWER}$. During the iterative low-precision sample activity according to this embodiment, the instruction set is adapted to multiply single, so as to avoid accessing the high-precision processor, and low-precision inputs 1830 are fed to the multiplier MY. Alternatively, the high-precision multiplier MX can be provided with some low-precision values, so as to efficiently use the processor (or where no low-precision multiplier is instantiated). By providing trailing zeros (0's) for the input low-precision values 1840, some power savings may be achieved (due to the lower overhead afforded by multiplying a long string of zeroes). While the power savings achieved by adding trailing zeroes to low-precision values operated on by a high-precision multiplier is somewhat less than that achieved by the low-power computing arrangement above, or by employing a low-precision multiplier, over a large, iterative process, the savings is still significant.

Figure 19:
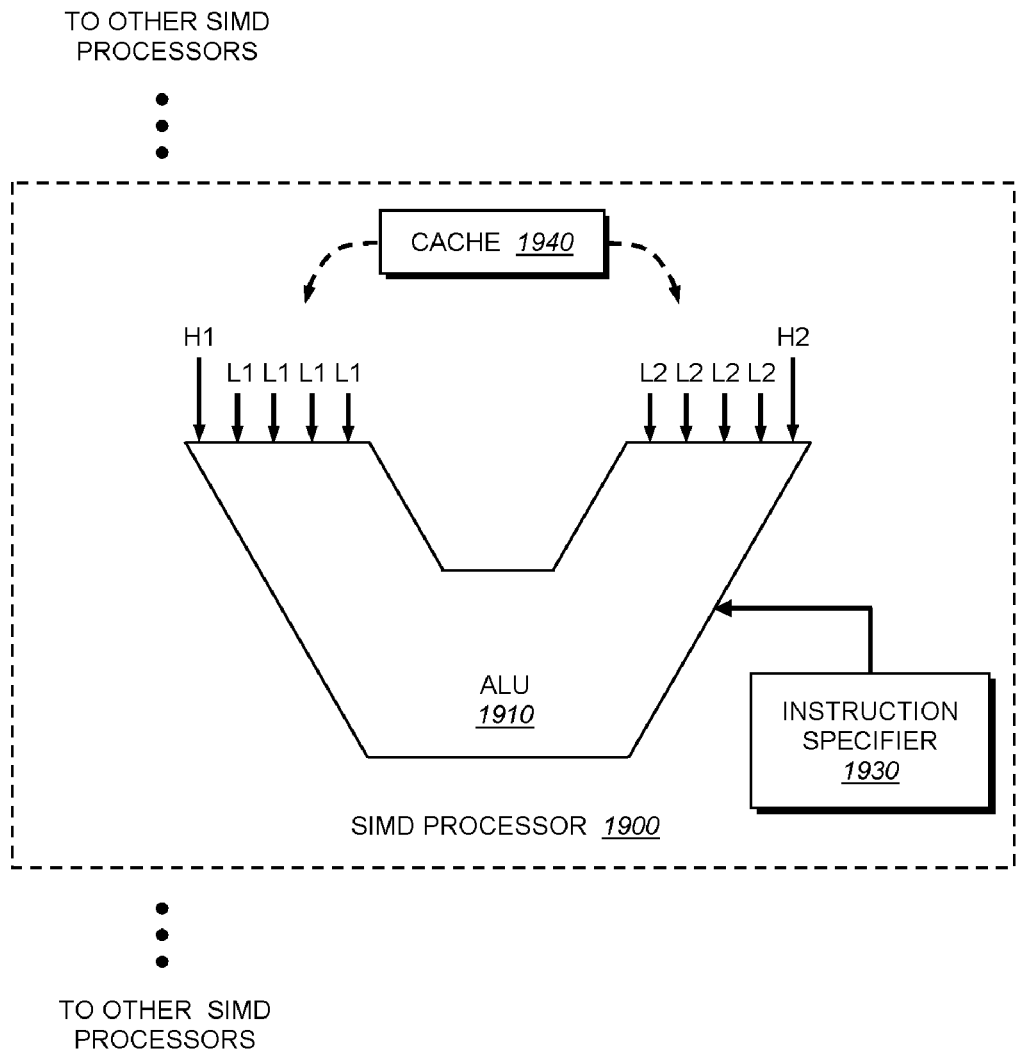
FIG. 19 is a block diagram of a SIMD-type processor detailing an ALU containing high-precision operation and a plurality of low-precision operations, wherein an illustrative embodiment of the procedure employs the low-precision operations to compute iterative low-precision values.

In another alternate embodiment, an array of commercially available or custom SIMD processors can be employed. Typical SIMD architecture supports a multiplicity of low-precision operations (e.g. 4 operations) for each high-precision operation. As shown generally in FIG. 19, a SIMD processor 1900, which can be part of a larger array of processors, includes an ALU 1910 that is adapted to provide one or more high-precision operations for at least two high-precision inputs H1 and H2, or four low-precision operations for one to four pairs of inputs L1 and L2. Operations are controlled by the instruction specifier 1930. SIMD processors generally employ a large cache 1940 to store data and instructions between high-precision and low-precision operation. In an embodiment, the program instructions of the simulation are adapted to instruct low-precision sampling operations during the low-precision cycles and the less-frequent, high-precision operations, such as aggregation, and particularly, the high-precision sampling process (1600), during high-precision operations. The ability to efficiently design the operation to fully utilize the operations without excessive program branching is desirable in a typical SIMD design.

Figure 20:
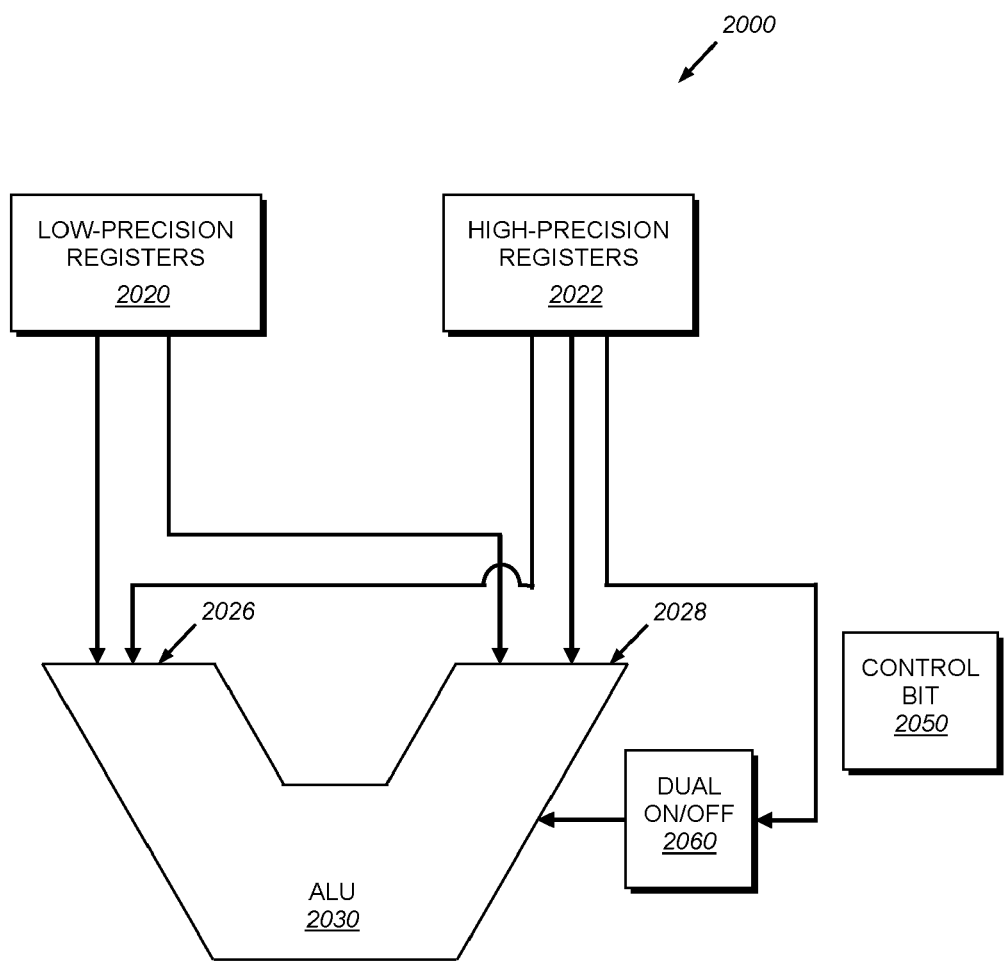
FIG. 20 is a block diagram of an alternate embodiment of an arrangement for computing high-precision and low-precision computations in a single architecture.
Figure 21:
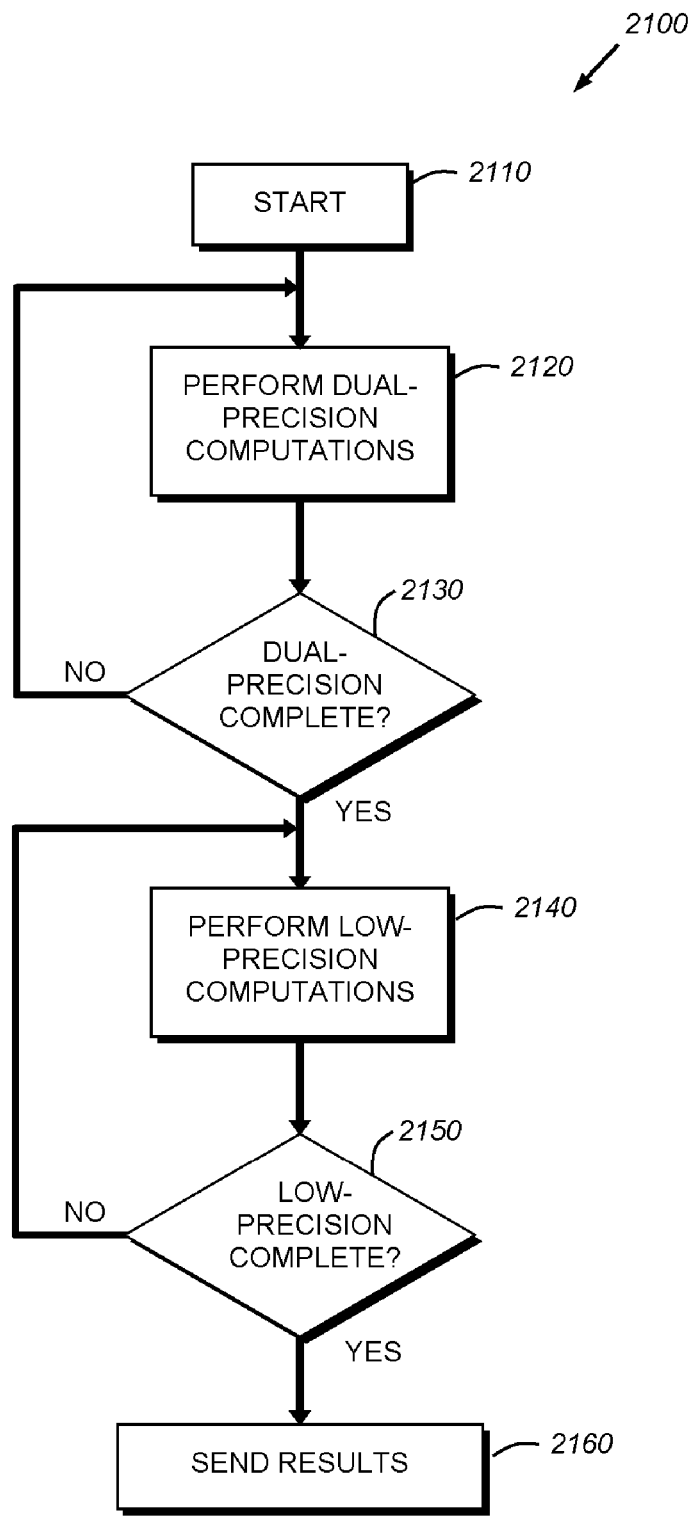
FIG. 21 is a process for runtime operation of the arrangement of FIG. 20.

In another embodiment, shown in FIGS. 20 and 21, the arrangement performs high/double-precision computations and low-precision computations in the same hardware piece (e.g. same chip die). Illustratively, as shown in FIG. 20, the single register arrangement 1200 of FIG. 12 is substituted with an arrangement 2000 low-precision register 2020 and high/double-precision register 2022. Each register inputs values into the two read ports 2028, 2028 of the ALU 2040 that is otherwise constructed and arranged similarly to that (1230) of FIG. 12. The high-precision ALU process is activated only when high-precision values are input. This is controlled via a control bit 2050 (or other information structure) associated with the high-precision register 2022. The control bit activates a dual on/off switch 2060 that only switches on the high-0precision functions in the ALU in the "on" state.

In operation of the arrangement 2000, as shown illustratively in FIG. 21, the procedure 2100 starts (step 2110) with a new set of computations. A series of high/dual-precision computations are performed in step 2120. In this embodiment, the computation step 2120 occurs until all high/dual-precision computations are complete (decision step 2130). The procedure 2100 that performs all low-precision computations with requisite subtraction occurring on an ongoing basis. When the low-precision computations are complete 2150, the error results are sent to follow-on processes (step 2160). The dual-high-precision hardware is effectively switched off between steps 2130 and 2140. It is contemplated that the overall computation process (2100) can be performed so that all high-dual precision computations as one operation and all low-precision computations occur as one separate operation (in a desired order therebetween). Alternatively, the high/dual-precision computations and low-precision computations can switch back-and-forth during the overall process until all computations have occurred.

It should be clear that the various embodiments of the system and method described above provide a significantly more-power-efficient and generally faster technique for processing highly iterative computations, such as the Monte Carlo simulation. This system and method can be employed on a variety of processor architectures and processing arrays, including those employing relatively low-power circuits for performing the majority of the computations (i.e. low-precision computations).

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the use of this system and method can beneficially be employed for large numbers of iterative samples in a single computational event or smaller numbers of iterative samples in a large number of discrete events. Overall, the number of iterative samples is large and, therefore advantageously handled by this system and method. While an illustrative embodiment is directed toward finance-based Monte Carlo computations, the system and method can be applied to other highly iterative computations, such as (but not limited to) the averaging of temperatures in a weather sensing system, chemical measurement analysis, determination of genetic coding, and the like. The processor arrangement employed to perform high-precision and low-precision processes is highly variable. High and low precision processors can exist on a single chip, or in discrete locations, being joined by a communication link. The quantity of high-precision computations versus the quantity of low-precision computations is also a highly variable ratio. In an embodiment, the number of high-precision computations could be in the range of approximately $1/10,000^{th}$ that of the low-precision computations. However, a notable improvement in processing overhead can be achieved with a quantity of high-precision computations that is approximately 20% that of the low-precision computations. Thus the term "substantially smaller", as used to define this ratio between quantities, can be taken broadly to include the contemplated ranges. More generally, the range can be taken to include between three and six orders of magnitude difference in quantities, between three and four orders of magnitude difference in quantities and four and five orders of magnitude difference in quantities. Additionally, any of the processes described herein can be implemented as hardware, software that consists of a computer-readable medium including program instructions, or a combination of hardware and software. Accordingly, this description is meant to be taken only by way of example, and not to otherwise limit the scope of this invention.

What is claimed is:

1. A system for computing a highly iterative computational task comprising:
    a low-precision processor array constructed and arranged to compute a plurality of low-precision inputs based on a random number seed in parallel so as to output a quantity of low-precision results;
    a high-precision processor array constructed and arranged to compute a plurality of high-precision inputs based on the random number seed in parallel so as to output a quantity of high-precision results that is substantially smaller than the quantity of low-precision results;
    an aggregator performing an aggregation process that sums the low-precision results and sums the high-precision results; and
    an error computation process that calculates a difference between the summed high-precision results and the summed low-precision results, and averages the difference to define error e, the error computation process being further constructed and arranged to subtract the error e from an average of the total of low-precision results to define a simulation estimate r.

2. The system as set forth in claim 1 wherein the low-precision processor array comprises a processor array defining a plurality of virtual processors on each of a plurality of interconnected low-power cores.

3. The system as set forth in claim 2 wherein the high-precision processor array is interconnected by a network connection to the low-precision processor array, the low-precision processor array comprising at least one host computer having an array of high-precision general-purpose processors.

4. The system as set forth in claim 1 wherein the low-precision processor array comprises a plurality of interconnected SIMD processors that compute the plurality of low-precision inputs using low-precision ALU operations.

5. The system as set forth in claim 1 wherein the plurality of low-precision inputs are between 8-bits and 32-bits and the high-precision values are at least 32 bits.

6. The system as set forth in claim 5 wherein the plurality of low-precision inputs are 32-bit values and the high-precision inputs are 64-bit values.

7. The system as set forth in claim 5 wherein the plurality of low-precision inputs are half-precision values and the high-precision inputs are single-precision values.

8. The system as set forth in claim 1 wherein the low-precision processor array includes a memory that stores program instructions for performing single-precision computation functions.

9. The system as set forth in claim 8 wherein the program instructions comprise instructions converted from double-precision computation functions to the single-precision computation functions by a find-and-replace procedure.

10. The system as set forth in claim 1 wherein the highly iterative computational task comprises computing estimated securities prices based upon a Monte Carlo procedure.

11. The system as set forth in claim 1 wherein the aggregator defines a plurality of layers of aggregators that perform summation of predetermined subsets of a total quantity of at least the low-precision values.

12. A method for computing a highly iterative computational task comprising the steps of:
   computing, with a low-precision processor array, a plurality of low-precision inputs based on a random number seed in parallel so as to output a quantity of low-precision results;
   computing, with a high-precision processor array, a plurality of high-precision inputs based on the random number seed in parallel so as to output a quantity of high-precision results that is substantially smaller than the quantity of low-precision results;
   aggregating the low-precision results into a low-precision total quantity and the high precision results into a high-precision total quantity;
   calculating a difference between the quantity of the high-precision results and the quantity of the low-precision results and averages the difference to define error e; and
   subtracting the error e from an average of the total of low-precision results to define a simulation estimate r.

13. The method as set forth in claim 12 wherein the step of computing, with the low-precision processor array, comprises providing a plurality of virtual processors on each of a plurality of interconnected low-power cores.

14. The method as set forth in claim 13 further comprising, interconnecting the high-precision processor array by a network connection to the low-precision processor array, and wherein the low-precision processor array comprises at least one host computer having an array of high-precision general-purpose processors.

15. The method as set forth in claim 12 wherein the low-precision processor array comprises a plurality of interconnected SIMD processors, and computing, with the SIMD processors, the plurality of low-precision inputs using low-precision ALU operations.

16. The method as set forth in claim 12 wherein the plurality of low-precision inputs are between 8-bits and 32-bits and the high-precision values are at least 32 bits.

17. The method as set forth in claim 12 further comprising, with the low-precision processor array, storing in a memory program instructions for performing single-precision computation functions.

18. The method as set forth in claim 17 further comprising, with the program instructions, converting from double-precision computation functions to the single-precision computation functions by a find-and-replace procedure.

19. The method as set forth in claim 12 wherein the highly iterative computational task comprises computing estimated securities prices based upon a Monte Carlo procedure.

20. The method as set forth in claim 12 wherein the step of aggregating includes aggregating a plurality of predetermined subsets of the total quantity of at least the low-precision values.

* * * * *